US009501944B2

(12) United States Patent
Boneta et al.

(10) Patent No.: US 9,501,944 B2
(45) Date of Patent: Nov. 22, 2016

(54) METHOD FOR ENHANCING MEMORY SKILLS

(71) Applicants: Sebastian Roberto Boneta, San Juan, PR (US); Alfonso Luis Boneta, San Juan, PR (US)

(72) Inventors: Sebastian Roberto Boneta, San Juan, PR (US); Alfonso Luis Boneta, San Juan, PR (US)

( * ) Notice: Subject to any disclaimer, the term of this patent is extended or adjusted under 35 U.S.C. 154(b) by 286 days.

(21) Appl. No.: 14/032,111

(22) Filed: Sep. 19, 2013

(65) Prior Publication Data

US 2014/0093860 A1    Apr. 3, 2014

Related U.S. Application Data

(60) Provisional application No. 61/702,811, filed on Sep. 19, 2012.

(51) Int. Cl.
*G09B 7/00*    (2006.01)

(52) U.S. Cl.
CPC ........................ *G09B 7/00* (2013.01)

(58) Field of Classification Search
None
See application file for complete search history.

(56) References Cited

U.S. PATENT DOCUMENTS

| | | | | |
|---|---|---|---|---|
| 5,888,071 A * | 3/1999 | Takamori | ............... | G09B 19/06 434/156 |
| 6,261,101 B1 * | 7/2001 | Benitz | ............... | G09B 19/06 434/156 |
| 6,652,283 B1 * | 11/2003 | Van Schaack | ........... | G09B 5/00 434/236 |
| 6,863,535 B2 * | 3/2005 | Krasney | ................. | G09B 29/10 434/156 |
| 2006/0234199 A1 * | 10/2006 | Walker | .................. | G09B 7/00 434/323 |
| 2006/0292531 A1 * | 12/2006 | Gibson | .................. | G09B 7/04 434/236 |
| 2007/0031798 A1 * | 2/2007 | Gottfried | ................. | G09B 7/00 434/236 |
| 2007/0141541 A1 * | 6/2007 | Chan | ........................ | G09B 5/06 434/236 |
| 2008/0176193 A1 * | 7/2008 | Lucy | ...................... | G09B 19/00 434/129 |
| 2011/0031693 A1 * | 2/2011 | Dvorak et al. | ................ | 273/273 |
| 2013/0295547 A1 * | 11/2013 | Silver | ...................... | G09B 7/00 434/362 |

* cited by examiner

*Primary Examiner* — Sunit Pandya

(74) *Attorney, Agent, or Firm* — Eugenio J. Torres-Oyola; Jose A. Medina-Cruz; Ferraiuoli LLC

(57) ABSTRACT

A system and method for assisting individuals in developing and refining memory skills is disclosed. The computer-base memory enhancing system provides users with a memory enhancing process, memory enhancing interface, memory enhancing files, and memory enhancing methods that provide users with tools to enhance memorization. Among the features and functionalities associated with the computer-base memory enhancing system are: (i) a memory enhancing method that suggests components from queries, (ii) a memory enhancing method that suggests component structures for arranging components, and (iii) a memory enhancing method that superposes components in real-world locations ("the augmented reality memory enhancing method").

21 Claims, 17 Drawing Sheets

Computer Base Memory Enhancing System

METHOD FOR ENHANCING MEMORY SKILLS

STATEMENT REGARDING FEDERALLY SPONSORED RESEARCH AND DEVELOPMENT

N/A

RELATED APPLICATIONS

N/A

BACKGROUND OF THE DISCLOSURE

Field of the Disclosure

The present disclosure relates generally to a memory enhancing system, interface, and methods for assisting individuals with memorization and in developing and/or enhancing memory skills, more particularly to a computer-base memory enhancing system, memory enhancing process, memory enhancing interface, memory enhancing files, and memory enhancing methods that provide users with tools to enhance memorization.

Discussion of the Background

The method of the loci (plural of Latin locus for place or location), also called the memory palace, is a mnemonic device introduced in ancient Roman rhetorical treatises (in the anonymous "Rhetorica ad Herennium," Cicero's "De Oratore," and Quintilian's "Institutio oratoria"). It relies on memorized spatial relationships to establish order and recollect memorial content. The term is most often found in specialized works on psychology, neurobiology and memory, though it was used in the same general way at least as early as the first half of the nineteenth century in works on rhetoric, logic and philosophy.

The memory palace is also commonly called the mental walk. In basic terms, it is a method of memory enhancement which uses visualization to organize and recall information. Many memory contest champions use this technique in order to recall faces, digits, and lists of words. These champions' successes have little to do with brain structure or intelligence, but more to do with their technique of using regions of their brain that have to do with spatial learning. Those parts of the brain that contribute most significantly to this technique include the medial parietal cortex, retrosplenial cortex, and the right posterior hippocampus.

Generally, memorization is a necessary skill in life, and particularly for education. However, memorization can be a boring, long, and tedious process requiring significant expenditures of time and effort. Visual memory techniques such as the memory palace method (aka the method of the loci) have been proven to lead to significant gains in memorization speed, capacity, and retention.

However, developing and mastering these techniques currently requires significant time, effort, study, and creativity. For example, US Patent Publication 2006/0234199 to Walker et al. discloses a system and method for developing memory skills but fails to provide a process for transforming linguistic inputs into visual images for memorization purposes. The process for transforming linguistic inputs for visual memorization requires significant time, effort, and creativity and can be a boring, long, and tedious process. Therefore there is a need for a method and/or system which assists with the transformation of linguistic inputs (words or sets of words) into components (hereinafter defined so as to include images, objects, subjects, spaces, words, and/or any combinations or subdivisions thereof) that can be (i) used to recall the original input, (ii) organized sequentially, and (iii) linked to corresponding databases.

Similarly, the transformation of an outline structured text with nested levels of headings and sub-headings, into components that can be (i) used to recall the original input, (ii) organized sequentially, and (iii) linked to corresponding databases requires significant time, effort, and creativity and can be a boring, long, and tedious process.

Therefore, there is a need to provide a system and method for memory enhancing and/or refining memory skills that overcomes the disadvantages and shortcomings of the prior art.

SUMMARY

The present disclosure overcomes the limitations of the previous computer-base memory enhancing system and method for developing and/or enhancing memory skills. The first preferred embodiment in accordance with the principles of the present disclosure comprises a programmable device including a computer platform, which can be programmed to perform a finite set of arithmetic or logical operations, wherein a set of instructions are provided by a memory enhancing system in the form of a computer-base memory enhancing program for automatically generating memory enhancing components and arranging those components in component structures. The memory enhancing components may be projected or displayed in an output device for presentation of information in visual form. The memory enhancing system may be hosted by a personal computer or at least one server which may accessed by network architecture by one or more clients.

Further the computer platform comprises at least a processing unit which executes a series of instructions, provided by the computer-base memory enhancing program, wherein said series of instructions comprises reading, manipulating, and storing data.

It is another object of the present disclosure to provide a method for the developing and/or enhancing of memory skills that can be edited by users through the manipulation of various computer-base memory enhancing program settings in order to personalize the components in order to enhance memorability for the specific user. The space is defined as the boundaries provided by the display device, wherein the visual form projected by said display device represents components selected by the user and/or generated by the computer platform which provides a set of boundaries comprising at least two dimensions (2D).

Another object of the present disclosure is to provide a method for the developing and/or enhancing of memory skills that can be edited by users through the manipulation of various computer-base memory enhancing program settings to personalize three dimensional (3D) components in order to enhance memorability for the specific user. People are more attentive and engaged with 3D displays and/or components in comparison with 2D displays and/or components during the memorizing procedures due to a more realistic perception of the display and images which result in superior development and/or enhancing of memory skills.

Another object of the present invention is to provide a method for the developing and/or enhancing of memory skills that superposes components at a real-world location. The method includes a digital image processing unit comprising an image identifier device such as digital camera, a computing platform, at least one display/screen, processor(s), memory, location identifier device such as a GPS, an image representation device in the form of signal generator or adjustable indicia such as barcodes, QR codes and a indicia identifier such as RFID reader, blue-tooth receiver and scanner. The method can be edited by users through the manipulation of various computer-base memory enhancing program settings to personalize components in the real-time location in order to enhance memorability for the specific user. People are more attentive and engaged with real-world locations and/or components which appear in those locations due to a more realistic perception which results in superior development and/or enhancing of memory skills.

Another object of the present disclosure is to provide a method for the developing and/or enhancing of memory skills that suggests components from queries.

Another object of the present disclosure is to provide a memory enhancing method that suggests component structures for arranging components based on query structures.

In accordance with the principles of the present disclosure, the computing platform comprises a memory enhancing system which uses a sequence of instructions to generate and/or upload components for the user. The components can be uploaded from a database. It is further contemplated that communication between the computing platform and the database can be achieved through the use of a network architecture. In such an embodiment, the network architecture may include, alone or in any suitable combination, a telephone-based network (such as a PBX or POTS), a local area network (LAN), a wide area network (WAN), a dedicated intranet, and/or the Internet. Further, the network architecture may include any suitable combination of wired and/or wireless components and systems. By using dedicated communication links or a shared network architecture, computing platform may be located in the same location or at a geographically distant location from input device, output device and database.

The disclosure itself, both as to its configuration and its mode of operation will be best understood, and additional objects and advantages thereof will become apparent, by the following detailed description of a preferred embodiment taken in conjunction with the accompanying drawings.

The Applicant hereby asserts, that the disclosure of the present application may include more than one invention, and, in the event that there is more than one invention, that these inventions may be patentable and non-obvious one with respect to the other.

Further, the purpose of the accompanying abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the disclosure of the application, which is measured by the claims, nor is it intended to be limiting as to the scope of the disclosure in any way.

BRIEF DESCRIPTION OF THE DRAWINGS

The accompanying drawings, which are incorporated herein, constitute part of the specification and illustrate the preferred embodiment of the disclosure.

DESCRIPTION OF THE PREFERRED EMBODIMENT

Figure 1:
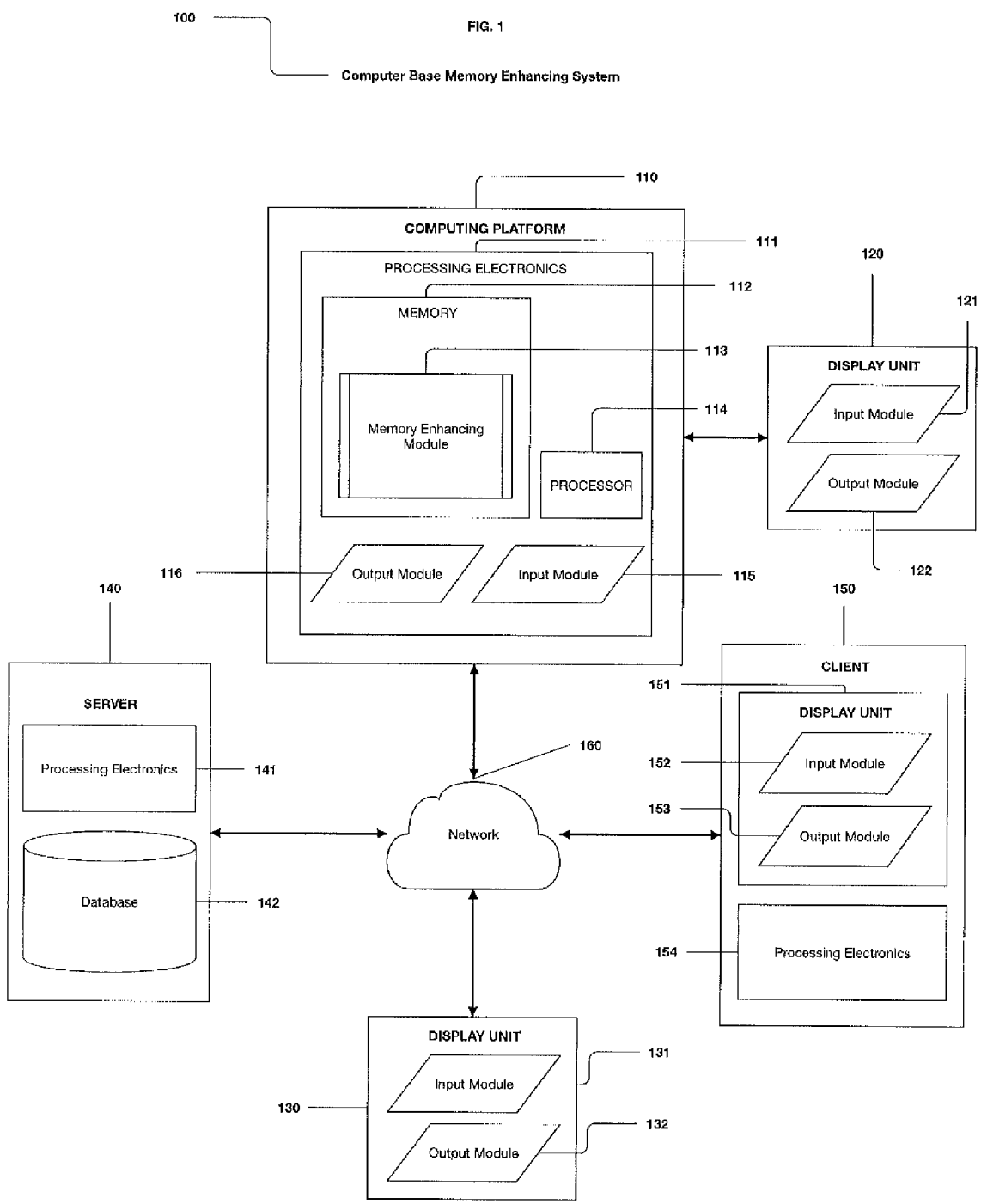
FIG. 1 shows a general structure in accordance with the principles of the present disclosure.

FIG. 1 illustrates a general structure of a computer base memory enhancing system for the developing and/or enhancing of memory skills. The computer base memory enhancing system 100 includes a computing platform 110. The computing platform 100 may be a personal computer, laptop, phone, tablet, wearable computing device, television, gaming console, server, or other programmable device. The computing platform 110 includes processing electronics 111. The processing electronics include memory 112, a processor 114, an input module 115, and an output module 116. The processor 114 may be implemented as a general purpose processor, an application specific integrated circuit (ASIC), one or more field programmable gate arrays (FPGAs), a group of processing components, or other suitable electronic processing components. The memory 112 is one or more devices (e.g., RAM, ROM, Flash memory, hard disk storage, etc.) for storing data and/or computer code for completing and/or facilitating the various processes described herein. The memory 112 may be or include non-transient volatile memory or non-volatile memory. The memory 112 may include data base components, object code components, script components, or any other type of information structure for supporting the various activities and information structures described herein. The memory 112 may be communicably connected to the processor 114 and includes computer code or instructions for executing one or more processes described herein (e.g., the memory enhancing module 113 and the processes contained therein described in FIGS. 2-16). The input module 115 may include a keypad, keyboard, trackball, mouse, soft button, motion sensing device, camera, or other interfaces. The output module 116 may be an internal display (i.e. digital projector) or one or more screens that display data in or from the computing platform 110. Further, the output module 116 may include sounds, smells, and/or tactile feedback. The output module 116 can be integrally made with the input module 115 or separate. The processing electronics 111 may be the processing electronics of server 141 or client 154, according to an exemplary embodiment.

The computer base memory enhancing system 100 may include or may be otherwise operatively coupled to a network 160, for example, an intranet, local area network, wide area network, extranet, the World Wide Web, other Internet-based network(s), or any combination thereof. The computer base memory enhancing system 100 may be configured to share information across the network 160. For example, data may be shared with multiple users through a server 140, display unit 130, or through a client 150. According to various exemplary embodiments, the computer base memory enhancing system 100 may include any number of computing platforms, servers, display units, and clients. While the server 140, client 150, and the display unit 130 are shown as separate devices and described as such in the embodiment of FIG. 1, the server 140 and client 150 in the computer base memory enhancing system 100 may be the same device as the computing platform 110, or the display units 130, 151 may be the same display unit 120 of the computing platform 110. It should be appreciated that any combination of computing platforms, servers, clients, and display units may be implemented in the computer base memory enhancing system 100 without departing from the scope of the present disclosure.

The computer base memory enhancing system 100 further may include one or more display units 120, 130, 151, which may be connected directly to the computing platform 110, or through a network 160, server 140, client 150, or any combination thereof. The display units 120, 130, 151 are shown located remotely from the computing platform instead of part of the computing platform. The display units 130, 151 are shown as connected to the network 160. According to various exemplary embodiments, the display units 120, 130, 151 may be part of the computing platform 110 (e.g., a display on a mobile phone, a wearable computing platform, or other programmable electronic device) or may be connected to another device not otherwise part of the computer base memory enhancing system 100 (e.g., a PC, laptop, another mobile phone, television screen, etc.). The display units 120, 130, 151, may contain input modules 121, 131, 152, for example, a touchscreen input, image capture, or motion sensing, etc. The display units 120, 130, 151, may also contain output modules 122, 132, 153, for example to couple the display units 120, 130, 151 with mobile phones or tablets, or to provide the server 140 and/or other components connected to the network 160 with information relating to the display units 120, 130, 151. Such information may include display information, screen resolution, digital content protection, communication format (e.g., digital or analog), etc. The output modules 122, 132, 153 can be integrally made with the input modules 121, 131, 152 or separate.

The computer base memory enhancing system 100 is shown to include a server 140. The server 140 includes processing electronics 141 and a database 142. According to one embodiment, the server 140 and more particularly the processing electronics 141 and database 142 are configured to receive data from the computing platform 110 via the network 160. The server 140, processing electronics 141, and database 142 analyze the data and generate model information associated with the data. The server 140, processing electronics 141, and database 142 may then generate memory enhancing files based on the model information. The server 140 then provides the memory enhancing files to a display unit 130 or client 150 for output to a user. The processing electronics 141 are configured in the memory enhancing module 113 to generate the model information and memory enhancing files as shown in greater detail in FIGS. 2-16. Further, the server 140 may be configured to receive one or more preference files. The preference files are files that include user preferences. For example, the preference files may indicate a preference in the memory enhancing files. The processing electronics 141 are configured to receive the preference files and to use the preference files for generation of the memory enhancing files.

The computer base memory enhancing system 100 is shown to include a client 150. The client 140 includes processing electronics 154 and a display unit 151. The client 150 is configured to request or receive memory enhancing files from the server 140. In one embodiment, the client 150 requests the server 140 to create the model information. In another embodiment, the server 140 is configured to send memory enhancing files to the client 150 upon receipt of a request from the computing platform 110 or another device. The client 150 may be a client that wants to order the model information or memory enhancing files as part of a subscription, according to one embodiment. It should be understood that the client 150 may interact with the computer base memory enhancing system 100 in various ways. For example, the client 150 may be configured to be any of the devices in the subsequent figures for interacting with the various systems of the present disclosure.

Figure 2:
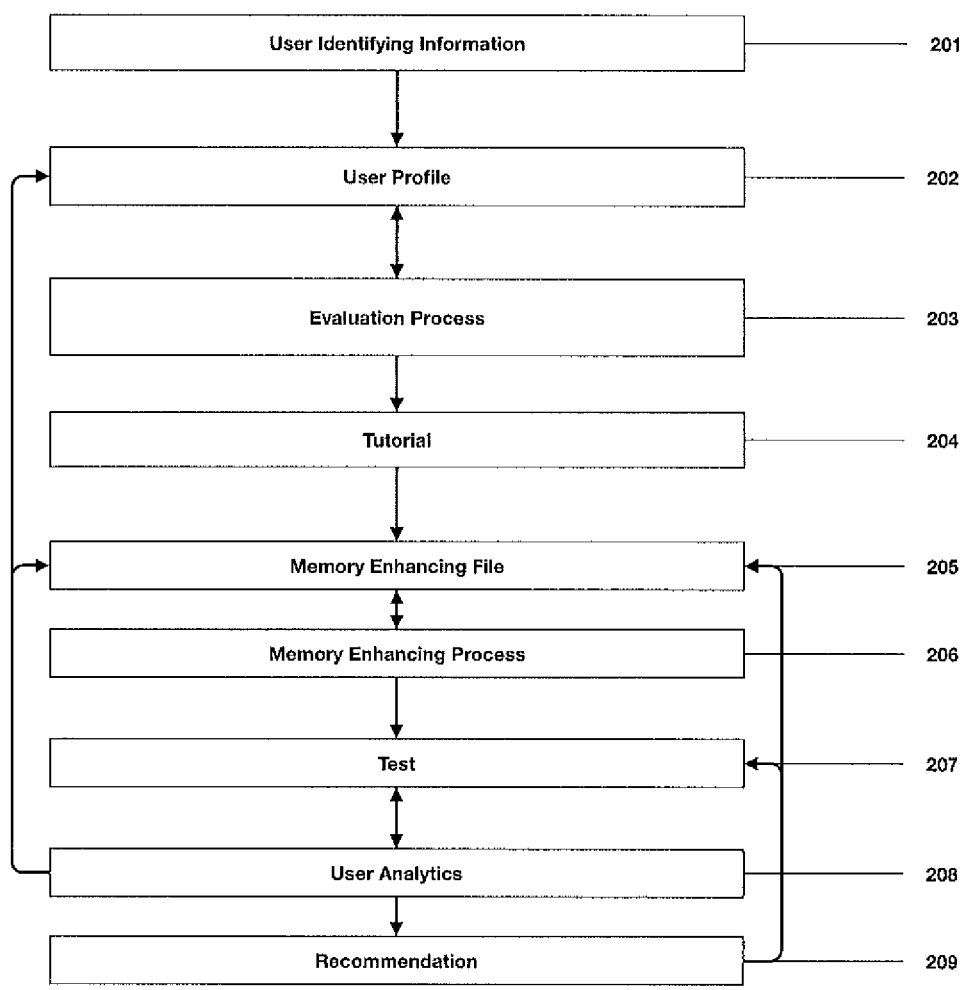
FIG. 2 shows a general process in accordance with the principles of the present disclosure

FIG. 2 shows a flow diagram of a process 200 for user registration and use of the computer base memory enhancing system 100 of FIG. 1. As explained above, the user controlling the input modules 115, 121, 131, 152 and/or the input modules in the processing electronics 111, 141, 154 accesses the computing platform 110, server 140, client 150, or any combination thereof, possibly by means of a network 160. Once the computing platform 110 is accessed, the processing electronics 111, 141, 154 and memory enhancing module 113 may require the process 200 as shown.

The process 200 includes asking the user for user identifying information (step 201), for example, name, age, gender, geographical location, password, contact information, and/or other user distinctive information. As shown, the user identifying information may be used to create or login to a user profile (step 202). The user profile may also include preference files, user history, user test data, user licenses, user account information, or other related information.

The process 200 further includes an evaluation process (step 203) based on the user profile (step 202). For example, the evaluation process may use or combine the information in the user profile (step 202) with information on a server 140. For example, user identifying information, preference files, user history, user test data, user licenses, user account information, or other related information, or any combination thereof may be used by the processing electronics 111, 141, 154 for generation of model information and memory enhancing files optimized for a user. For example, user test data referring to information about a future exam date may be used to suggest or optimize a study schedule given the current date. The evaluation process (step 203) may include parameters suggested by a user or an artificial intelligent agent (AIA), such as a computer program (e.g. the memory enhancing module 113). The parameters may include time, amount of material to be learned per day, subject(s) to be covered in a particular period of time, and others. The evaluation process (step 203) may suggest predetermined parameters to be selected by the user. As explained above, the AIA may use the information contained in the user's profile to generate suggestions.

Further, the process 200 includes a tutorial (step 204) which may be offered to the user based on the user profile. For example, based on the user history, a new user may be offered the tutorial (step 204) whereas an experienced user may be not be offered the tutorial (step 204).

Once the user has accessed the computing platform 110, the memory enhancing module 113 is used to create or access a memory enhancing file (step 205). Several graphical interfaces are used to create or access the memory enhancing file (step 205), for example, the memory enhancing interface 400 detailed in FIG. 4. The creation or accessing of the memory enhancing file (step 205) is explained below in greater detail in FIGS. 2-16.

After the creation or access of the memory enhancing file (step 205), a memory enhancing process starts (step 206). The memory enhancing process uses the created or accessed memory enhancing file (step 205). The memory enhancing process (step 206) is explained in greater detail below in FIGS. 6-16.

A test (step 207) may be administered as a game or exam. The test (step 207) and resulting test history data is used to identify user deficiencies based on the user profile and may further be used to optimize the memory enhancing file, suggesting improvements resulting in changes to the memory enhancing file, and/or resulting in changes to the user profile. For example, the test history data may be saved in the user profile and analyzed by the computer base memory enhancing system 100 to manage the user's progress.

Further, the process 200 includes user analytics (step 208) where the user can view test history data. In one embodiment, a user may be able to view the test history data of other users to compare their performance, identify deficiencies in, and suggest improvements to, the memory enhancing file. The user analytics (step 208) may also compare memory enhancing test results with predefined parameters and/or information provided on the evaluation process (step 203) in order to track user progress and identify deficiencies in, and suggest improvements to, the memory enhancing file. User analytics (step 208) also creates reports with results which may be stored in the processing electronics 111, 141, 154 or database 142.

Further, the process 200 includes a recommendation (step 209) based on the outcomes of the user analytics (step 208). The recommendation (step 209) uses data from the user analytics process to recommend a further action. The actions may include, but are not limited to, taking the test again and/or making changes to the memory enhancing file.

Figure 3:
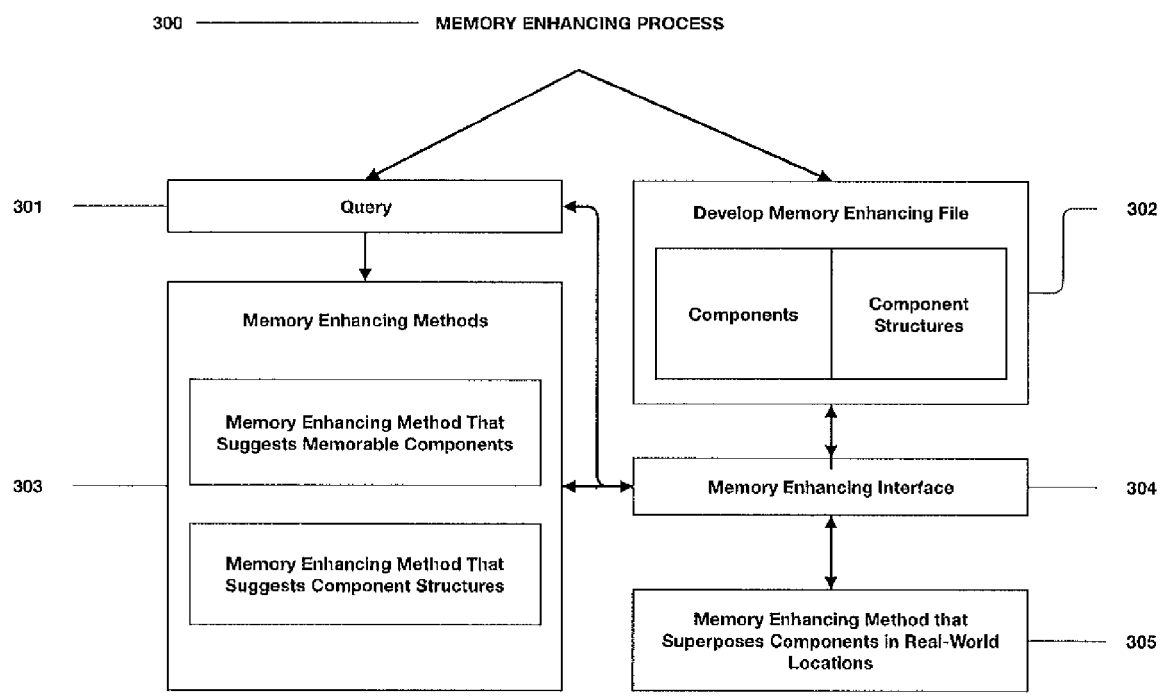
FIG. 3 shows a flowchart exemplary embodiment of the memory enhancing process in accordance with the principles of the present disclosure.

FIG. 3 shows a more detailed flow diagram of a memory enhancing process 300. The memory enhancing process 300 may be the memory enhancing process (step 206) of FIG. 2. As shown, the process 300 allows a user to perform queries 301 or develop memory enhancing files 302 using the memory enhancing interface 304 explained below in greater detail in FIGS. 4, 5, 16, and 17. The memory enhancing files may be the memory enhancing files (step 205) of FIG. 2.

Each query 301 may be in the form of text (e.g. word(s), number(s), and other character(s) arranged in sentence(s), paragraph(s), line(s), page(s), chapter(s), outline(s) or other structures) which can be analyzed and transformed into components and component structures by the memory enhancing methods 303. The memory enhancing methods 303 are explained below in greater detail in FIGS. 5-17. In general, the memory enhancing methods 303 accept a query, said query is parsed by the user or an artificial intelligent agent (AIA), resulting in a selection nominated by the memory enhancing methods 303. Next a search for particular components and component structures is performed following a sequence of instructions provided by the memory enhancing methods 303. For example, components such as images, words, sounds, and/or objects may be selected. Further, component structures such as, for example, arrangements of images, maps, or 3D models of rooms, floors, and buildings may be selected. The components and component structures are selected by the user or an artificial intelligent agent (AIA), such as a computer program (e.g. the memory enhancing module 113) and then may be saved in the memory enhancing file 302 using the memory enhancing interface 304. The memory enhancing interface 304 is explained below in greater detail in FIGS. 4, 5, 16, and 17.

The placement of the selected components is performed by the user or an artificial intelligent agent (AIA), such as a computer program (e.g. the memory enhancing module 113), through the memory enhancing interface 304. The memory enhancing interface 304 may receive a request from the user or AIA to determine a preferred organization of components which can be saved independently as a component structure.

Another option is the creation of particular indicia or options for real-time and real-world placement of components. For example, the memory enhancing method that superposes components in real-world locations 305, explained below in greater detail in FIG. 17. Either way, once the placement is completed, the information is saved in the memory enhancing file 304.

In accordance with the principles of the present disclosure, a user or AIA may develop memory enhancing files 302 for assisting, developing and/or refining memory skills. Further, the memory enhancing files 302 are comprised of components and component structures. The memory enhancing process 300 will allow users or an AIA to create and/or download components or component structures independently of each other and combine them modularly to create new memory enhancing files 302. For example, a user could download an existing memory enhancing file composed of components, such as images and words from the subject anatomy, mapped on a component structure, such as an image, map, 3D model, or specific GPS coordinates of the Eiffel tower. Then, the user could extract the anatomy subject components and map them onto a new component structure, such as an image, map, 3D model, or specific GPS coordinates of a hospital, or even an image or 3D model of the word "hospital" or the letter "H".

The memory enhancing methods 303, 305 can break components and component structures down into smaller units, such as, for example, breaking down an outline into headings and subheadings; or a space into subspaces; or a book into chapters, paragraphs, sentences, words, or letters; or objects into shapes, lines, or points, etc. For example, given an input of an anatomy outline, the memory enhancing methods 303 could break it down into headings such as skeletal, cardiovascular, nervous, digestive, etc. In turn, the headings could be further broken down into subheadings (for example, skeletal into groups of bones such as arm bones, hand bones, leg bones, or foot bones, etc.). Another example, given an input of a real-world location such as the city of Paris, or an image, map, 3D model, or GPS coordinates of the city of Paris, the memory enhancing methods 303, 305 could break the city down into areas composed of neighborhoods, blocks, and buildings; buildings could be further broken down into floors or rooms; rooms could be further broken down into individual points of interest, etc.

The memory enhancing methods 303, 305 can also combine components and component structures or any subdivisions thereof into larger units. The memory enhancing methods 303, 305 allow a user to quickly and easily combine components and component structures by, for example, automatically arranging or suggesting different arrangements.

Using the memory enhancing methods, users will be able to download, map (using GPS, wifi, accelerometer, compass, camera, or other inputs, etc.), build, index, edit, and/or save memory enhancing files, as well as easily arrange components based on the suggestions of an AIA. Additionally the computer-base memory enhancing methods 303, 305 can suggest different media files (text, images, sound, video, and/or 3-D models) as options for the user to quickly and easily decide to select as components. These media files can be accessed and/or played through proprietary libraries and/or databases or by linking to external media files on publicly available Internet libraries and/or databases (similar to a link in a web browser). Thus, a component could link to an html website, audio file, video file, etc.

As a motivational option that aims to make memorization fun and rewarding, the memory enhancing process 300 can include a game and/or test mode through the memory enhancing interface 304 wherein users can track their progress. Accordingly with the present invention, game and/or test events can be incorporated into components and component structures so that a user's progress through components and component structures can be related to progress through game and/or test events.

Figure 4:
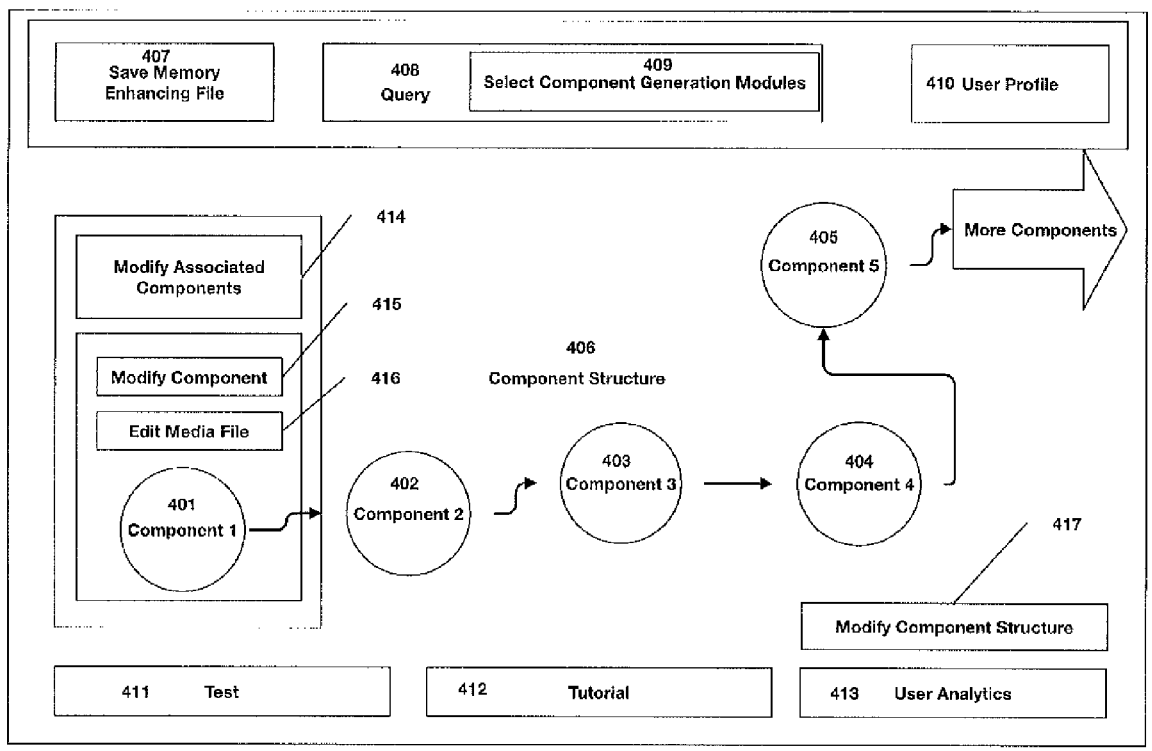
FIG. 4 shows a general structure for a memory enhancing interface in accordance with the principles of the present disclosure.

FIG. 4 is directed to a general exemplary embodiment of a structure for a memory enhancing interface 400. As shown in FIG. 4, components 1-5 (401-405) are superposed on a component structure (406). The components (401-405) and/or the component structure (406) may be 2D or 3D, and may be associated with any number of components or media files. For example, components may be associated to the original query or to a sound or image media file. As shown in FIG. 4, a user or AIA may make a number of selections in the memory enhancing interface. For example, a user may: save a memory enhancing file 407; perform a query 408 (including selecting component generation modules 409 for the query); access the user's profile 410; enter a test mode 411; enter a tutorial mode 412; enter a user analytics mode 413; Memory Enhancing Method that Suggests Components.

Figure 5:
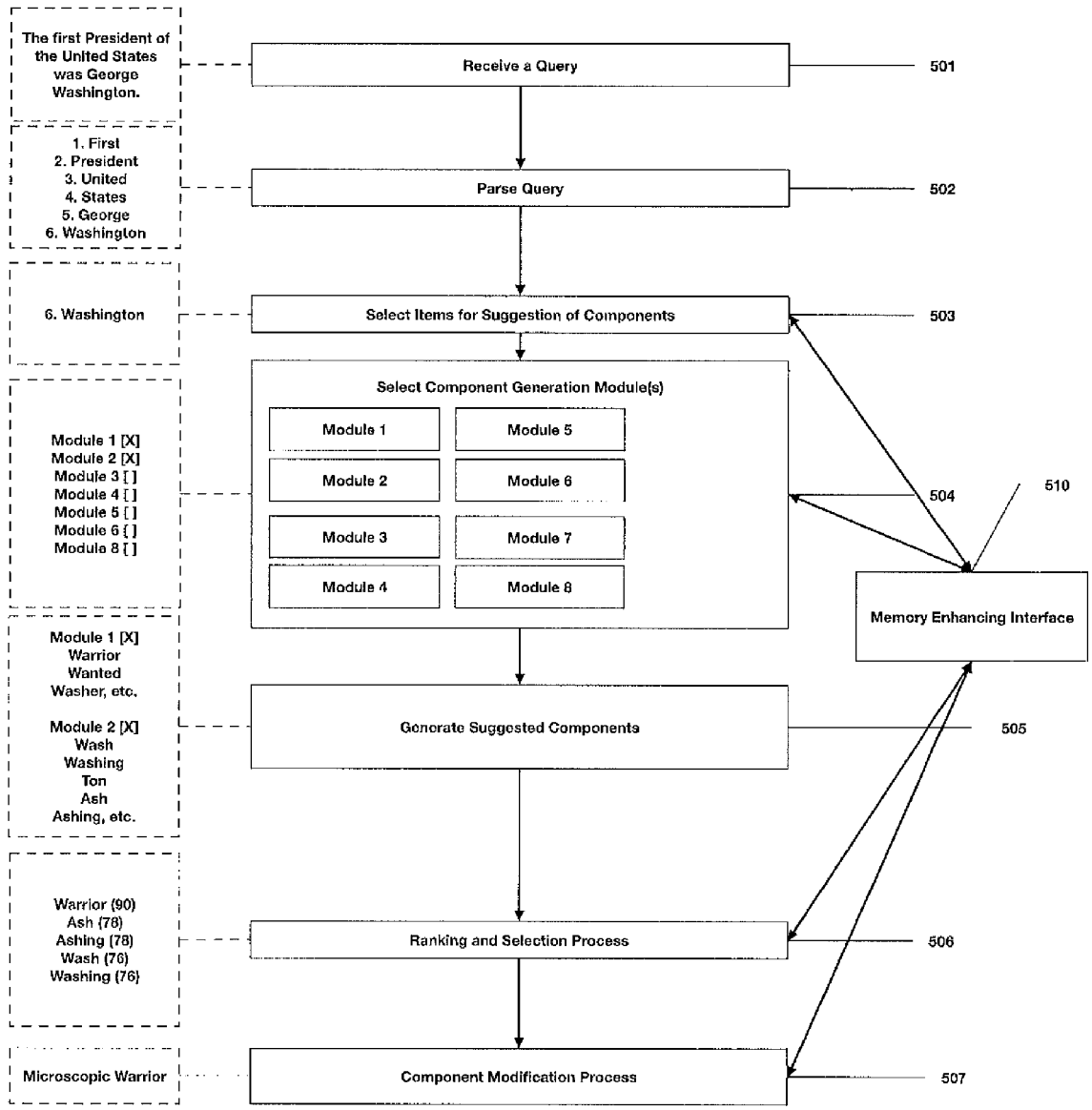
FIG. 5 shows a more detailed process of the memory enhancing method that suggests components in accordance with the principles of the present disclosure.

FIG. 5 is directed to the general process of the memory enhancing method that suggests components 500 (e.g. words, images, or other components) from queries. The memory enhancing method 500 may be the memory enhancing method 303 of FIG. 3. FIGS. 6 through 15 are directed to particular procedures for component generation modules (step 504) and other processes for generating suggested components (step 505).

As shown in FIG. 5, given a query which may be text, for example in the form ("X", "Y", "Z" . . . ) where X, Y, Z correspond to individual words composed of one or more letters (so that, for example, X=xabc . . . , Y=yabc . . . , and Z=zabc . . . , etc.) and separated by one or more spaces and/or punctuation marks (e.g. " ", "_", "-", ".", "", ",", ":" etc.), the memory enhancing method 500 comprises the following steps:

1. Receive a query (step 501), as shown, a query is received from one or more users or from an AIA.

2. Parse query (Step 502), as shown, separates the linguistic input into the individual words X,Y,Z. For example, if the user queries a sentence or paragraph, the memory enhancing method 500 eliminates the spaces and punctuation marks. Further, cross-referencing with a parsing database, the method 500 eliminates words which match words in the parsing database, such as, for example articles and prepositions. In this way, the initial set (X,Y,Z) can be reduced to the form (X, Z) where X and Z are words not contained in the parsing database.

3. As shown, select items for suggestion of components (Step 503), may include storing in memory the parsed query (X, Z) as significant word inputs (SWI). For example, SWI "X", in the form (xabc . . . ) and SW "Y" in the form (yabc . . . ). Then, the user and/or AIA selects among the SWIs for those which the memory enhancing method 500 should generate components. The user or AIA may use the memory enhancing interface 507 to make this selection. This memory enhancing interface may be the same memory enhancing interface 304 from FIG. 3.

4. As shown, select component generation module(s) (Step 504) may include allowing a user or AIA to select one or more component generation modules FIGS. 6-14 that can accept the selected SWIs as inputs and generate suggested components for each SWI based on at least one of the module processes detailed below in step 505 and FIGS. 6-14. The user or AIA may use the memory enhancing interface 507 to make this selection. This memory enhancing interface may be the same memory enhancing interface 304 from FIG. 3.

5. As shown, generate suggested components (step 505) may include the processing of the selected SWIs using one or more component generation modules. The module processes are detailed below and in FIGS. 6 through 14. The user or AIA may use the memory enhancing interface 507 to make all selections detailed in this step. This memory enhancing interface may be the same memory enhancing interface 304 from FIG. 3.

Module 1.

Figure 6:
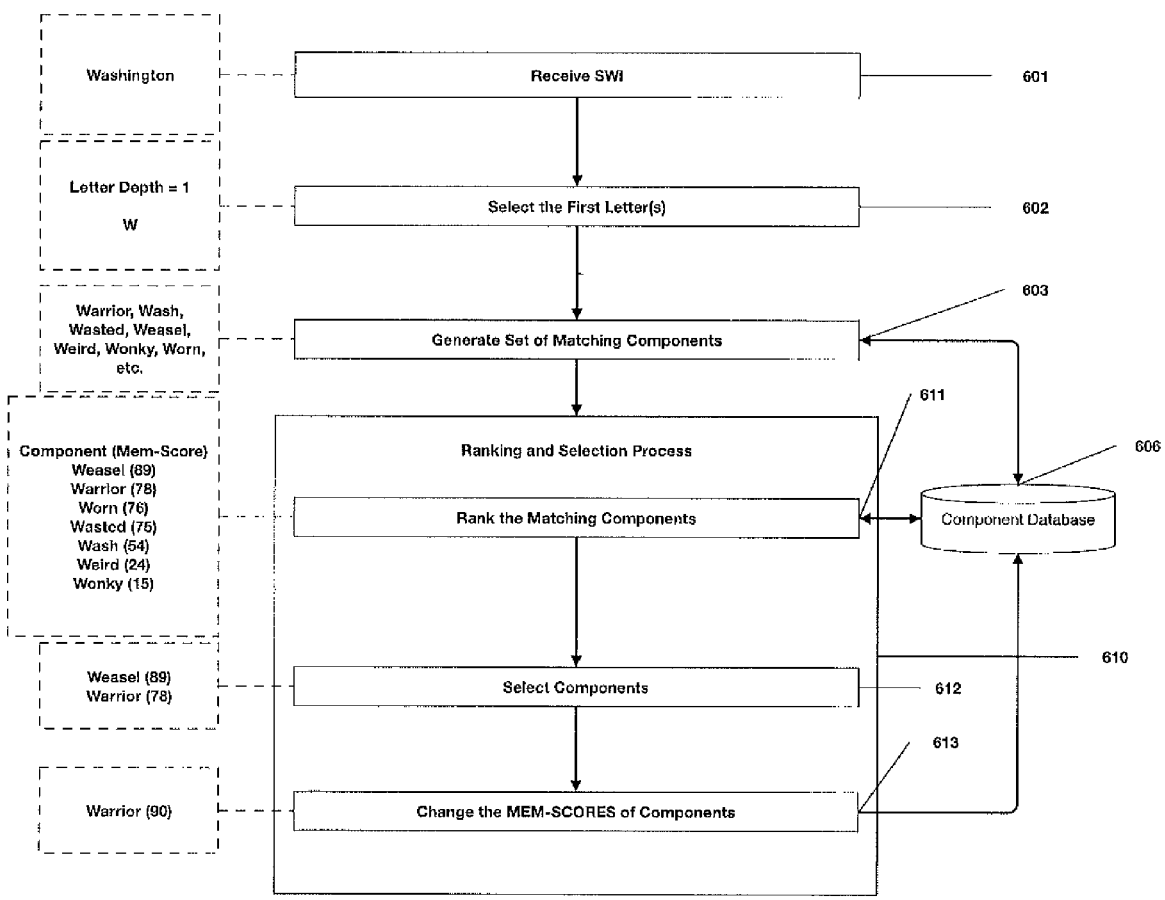
FIG. 6 shows a flowchart exemplary embodiment of a component suggesting process in accordance with the principles of the present disclosure.

As shown in FIG. 6, the module 1 process 600 may receive a SWI (step 601) from step 504 above. Then, the user or AIA may select the first letters 602 of the SWI, ie. a number of letters from the SWI beginning with the first letter. For example, given the SWI "Washington", a user or AIA may select the first letter "W", the first two letters "WA", the first three letters "WAS", etc. until the end of the word. As shown, given the word "Washington" and a letter selection of 1, the module 1 process 600 selects the letter "W". Further, cross-referencing with a component database 606 in which components (e.g. words) may be organized alphabetically, the process 600 may generate a set of matching components (step 603) where all matching components begin with the same letters selected in step 602. Such component database 606 may be located in the processing electronics 111, 141, 154 or the database 142 of FIG. 1. Further, the components in the component database 606 may be associated with a pre-assigned and/or dynamic MEM-SCORE (e.g. a number range, e.g. from "1-100"). The module 1 process 600 may then undertake a ranking and selection process 610 whereby it may rank the matching components (step 611) generated in step 603, above. According to such a ranking, certain components falling below a certain threshold may be eliminated. For example, as shown in FIG. 6, all components with scores below 75 are eliminated and only the matching components "Weasel (89)" and "Warrior (78)" are retained. Further, any remaining components may be presented to the user or AIA for selection in a list that can be organized according to the component MEM-SCORES. For example, components with higher MEM-SCORES may be presented first. Further, the ranking may only nominate a certain number of top components with the highest MEM-SCORES for the next step, for example, the top three, top five, or top ten, results. Further, the process 600 may present the ranked components to the user or AIA for them to select components (step 612) in order of preference. Further, the user or AIA selection may be stored in the component database 606 and such selection may be used to change the MEM-SCORES of components (step 613) in the component database 606. For example, if a user selects a component, this may result in a higher MEM-SCORE being assigned to that component in the future. Conversely, if a user does not select a component, this may result in a lower MEM-SCORE being assigned to that component in the future.

Module 2.

Figure 7:
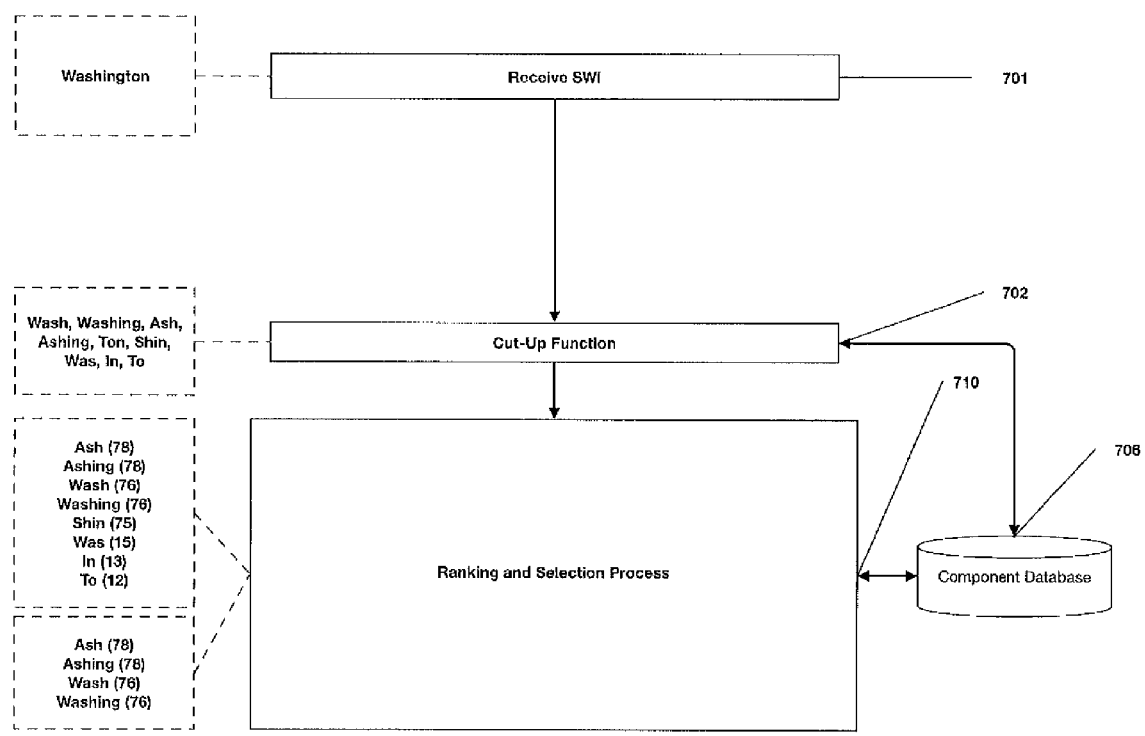
FIG. 7 shows a flowchart exemplary embodiment of a component suggesting process in accordance with the principles of the present disclosure.

As shown in FIG. 7, the module 2 process 700 may include the following steps: Receive the SWI (step 701) whereby the module 2 process 700 may receive the SWI from step 504 above. The module 2 process 700 may then perform a cut-up function (step 702) whereby the SWI is divided into all component words by cross-referencing all possible sequential sets of letters in the SWI with a component database 706 and generating a set of all components thus identified. Such component database 706 may be located in the processing electronics 111, 141, 154 or the database 142 of FIG. 1. For example, given the SWI "Washington", might yield a set including "wash", "washing", "ton", "ash", "ashing", "shin", "to", "was", "in", etc. Components in this set may also be ranked and selected by a ranking and selection process (step 710). The ranking and selection process (step 710) may be the same ranking and selection process (step 610) detailed in FIG. 6, above.

Module 3.

Figure 8:
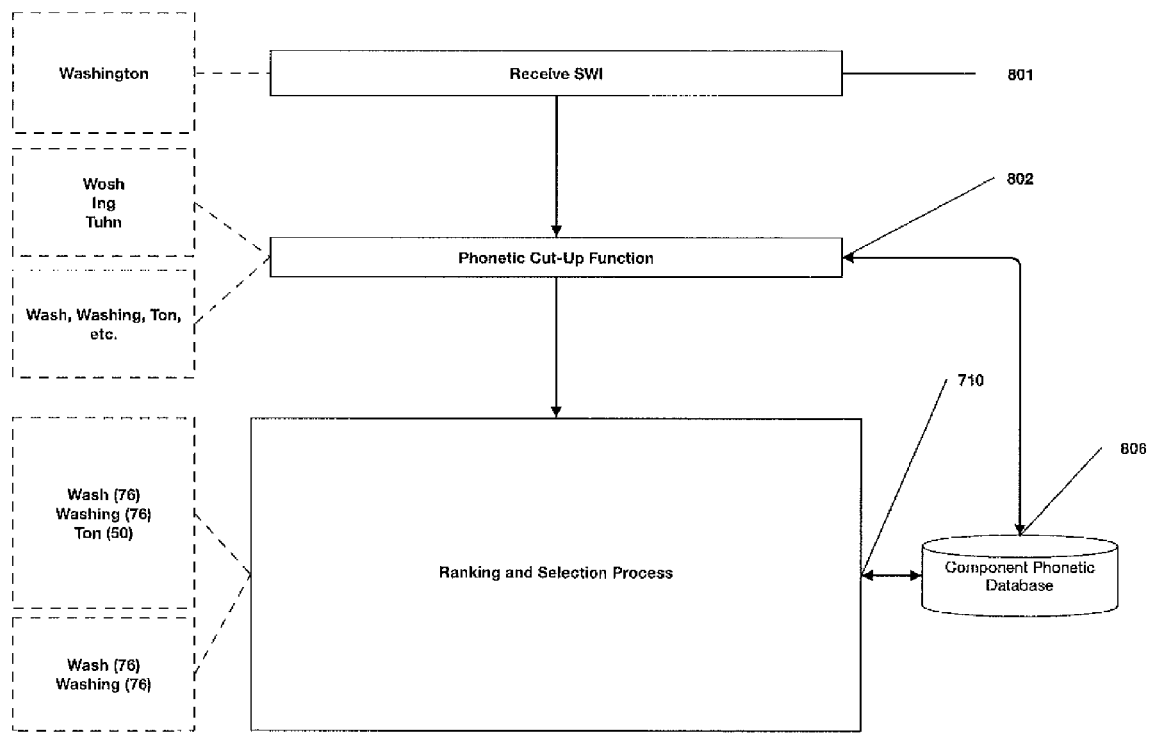
FIG. 8 shows a flowchart exemplary embodiment of a component suggesting process in accordance with the principles of the present disclosure.

As shown in FIG. 8, the module 3 process 800 may include the following steps: Receive the SWI (step 801) whereby the module 3 process 800 may receive the SWI from step 504 above. The module 3 process 800 may then perform a phonetic cut-up function (step 802) whereby the SWI is divided into all component phonemes by cross-referencing with a component phonetic database 806. Such component database 806 may be located in the processing electronics 111, 141, 154 or the database 142 of FIG. 1. For example, as shown in FIG. 8, the SWI "Washington" would yield the phonetic sequence "wosh-ing-tuhn" where "wosh" "ing" and "tuhn" are individual phonemes. The module 3 process 800 may then cross-reference the resulting phonemes with the component phonetic database 806 which may be organized by phonemes. The module 3 process may then generate a set of all individual words thus identified as containing one or more of the same or similar phonemes. For example, as shown in FIG. 8, the words "Wash", "Washing", and "Ton" may be generated. Further, components in this set may also be ranked and selected by a ranking and selection process (step 810). The ranking and selection process (step 810) may be the same or similar to the ranking and selection process (step 610) detailed in FIG. 6, above.

Module 4.

Figure 9:
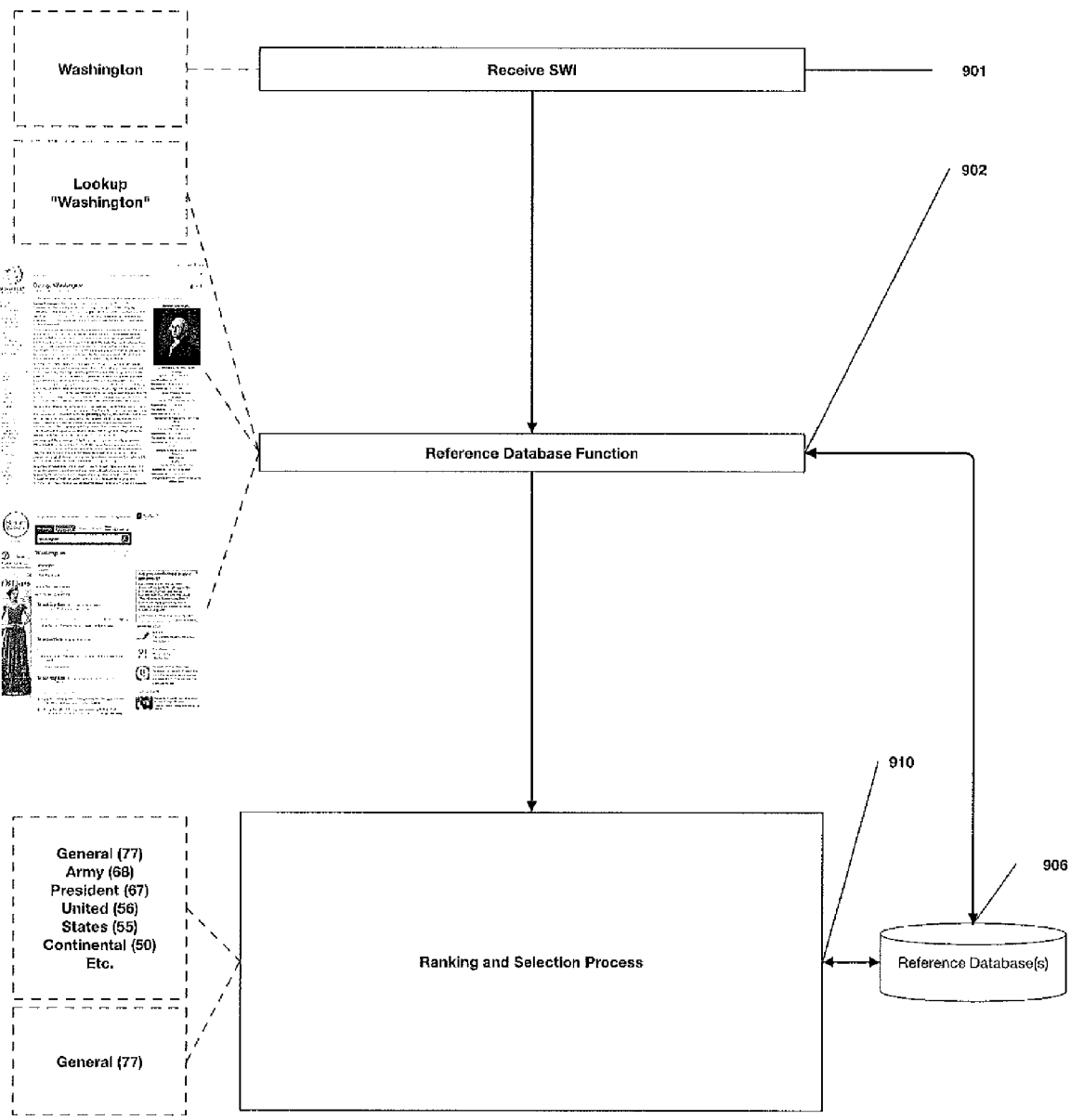
FIG. 9 shows a flowchart exemplary embodiment of a component suggesting process in accordance with the principles of the present disclosure.

As shown in FIG. 9, the module 4 process 900 may include the following steps: Receive the SWI (step 901) whereby the module 4 process 900 may receive the SWI from step 504 above. The module 3 process 800 may then perform a reference database function whereby the SWI is input into one or more reference database(s) 906 (e.g. a dictionary or encyclopedia such as, for example, Webster's, Wikipedia, etc.) which will return a set of components in the form (X,Y,Z) where X, Y, and Z are individual components (e.g. words, images, 3D models, etc.) contained in the results from such reference database 906 search results. Such reference database(s) 906 may be located in the processing electronics 111, 141, 154 or the database 142 of FIG. 1. For example, as shown in FIG. 9, the module 4 process 900 may generate a set of all of the words and images contained in the Wikipedia html page result and/or the Webster's Dictionary html page result. Further, the module 4 process 900 may then send the resulting sets as new inputs to all other modules, recursively for a given depth, creating a number of new sets. The resulting sets may also be ranked and selected by a ranking and selection process (step 910). The ranking and selection process (step 910) may be the same or similar to the ranking and selection process (step 610) detailed in FIG. 6, above.

Module 5.

Figure 10:
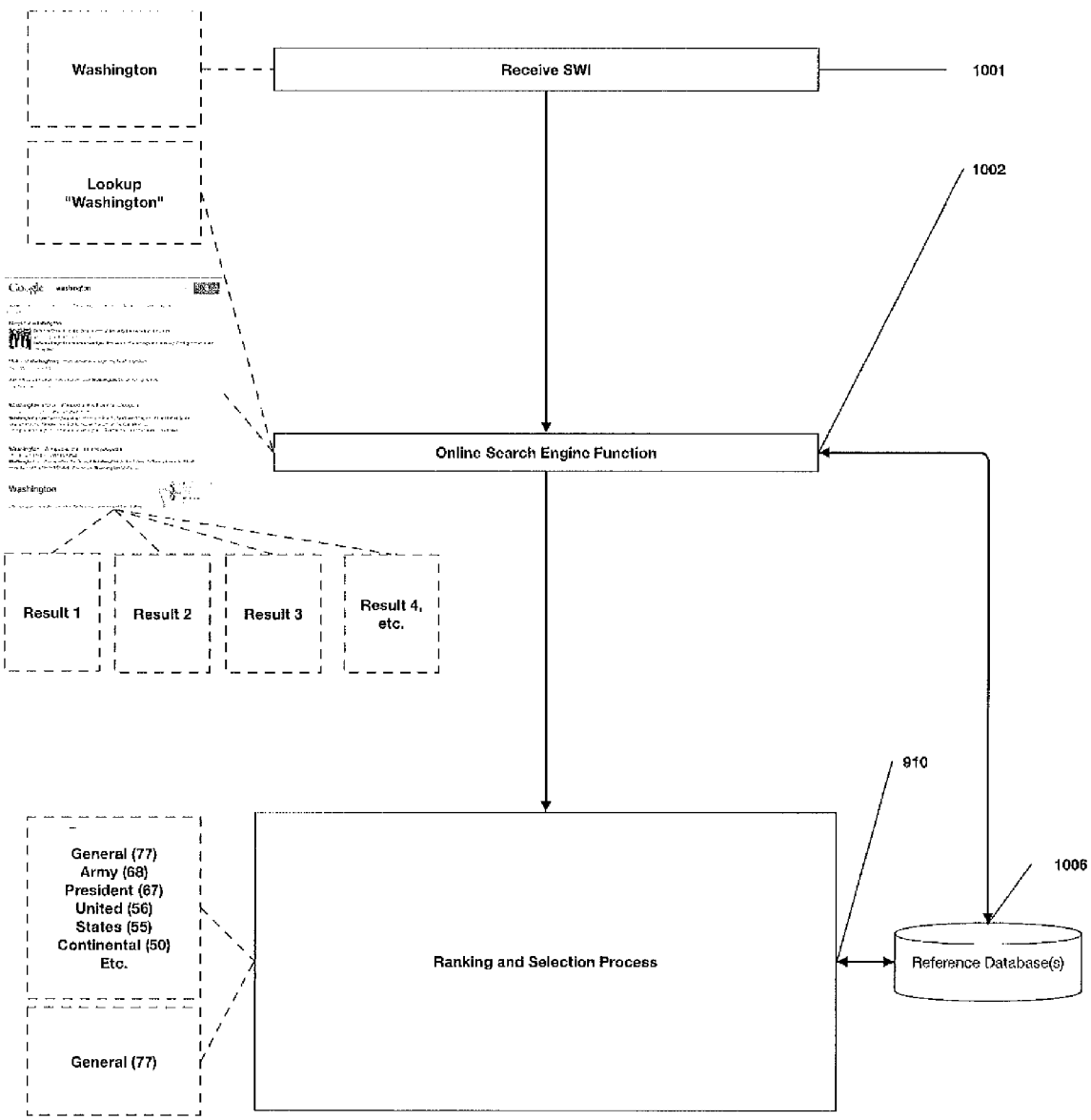
FIG. 10 shows a flowchart exemplary embodiment of a component suggesting process in accordance with the principles of the present disclosure.

As shown in FIG. 10, the module 5 process 1000 may include the following steps: Receive the SWI (step 1001) whereby the module 5 process 1000 may receive the SWI from step 504 above. The module 5 process 1000 may then perform an online search engine function 1002 whereby the SWI is input into one or more reference database(s) 1006 (e.g. Google, Bing, etc.) which may return a set (a pre-defined number of "top results", for instance, the first 10 html pages thus obtained) in the form (X,Y,Z) where X, Y, and Z are individual components (e.g. words, images, 3D models, etc.) contained in the results (for example, in the html code). Such component database 1006 may be located in the processing electronics 111, 141, 154 or the database 142 of FIG. 1. Further, the module 5 process 1000 may then send the resulting sets as new inputs to all other modules, recursively for a given depth, creating a number of new sets. The resulting sets may also be ranked and selected by a ranking and selection process (step 1010). The ranking and selection process (step 1010) may be the same or similar to the ranking and selection process (step 610) detailed in FIG. 6, above.

Module 6.

Figure 11:
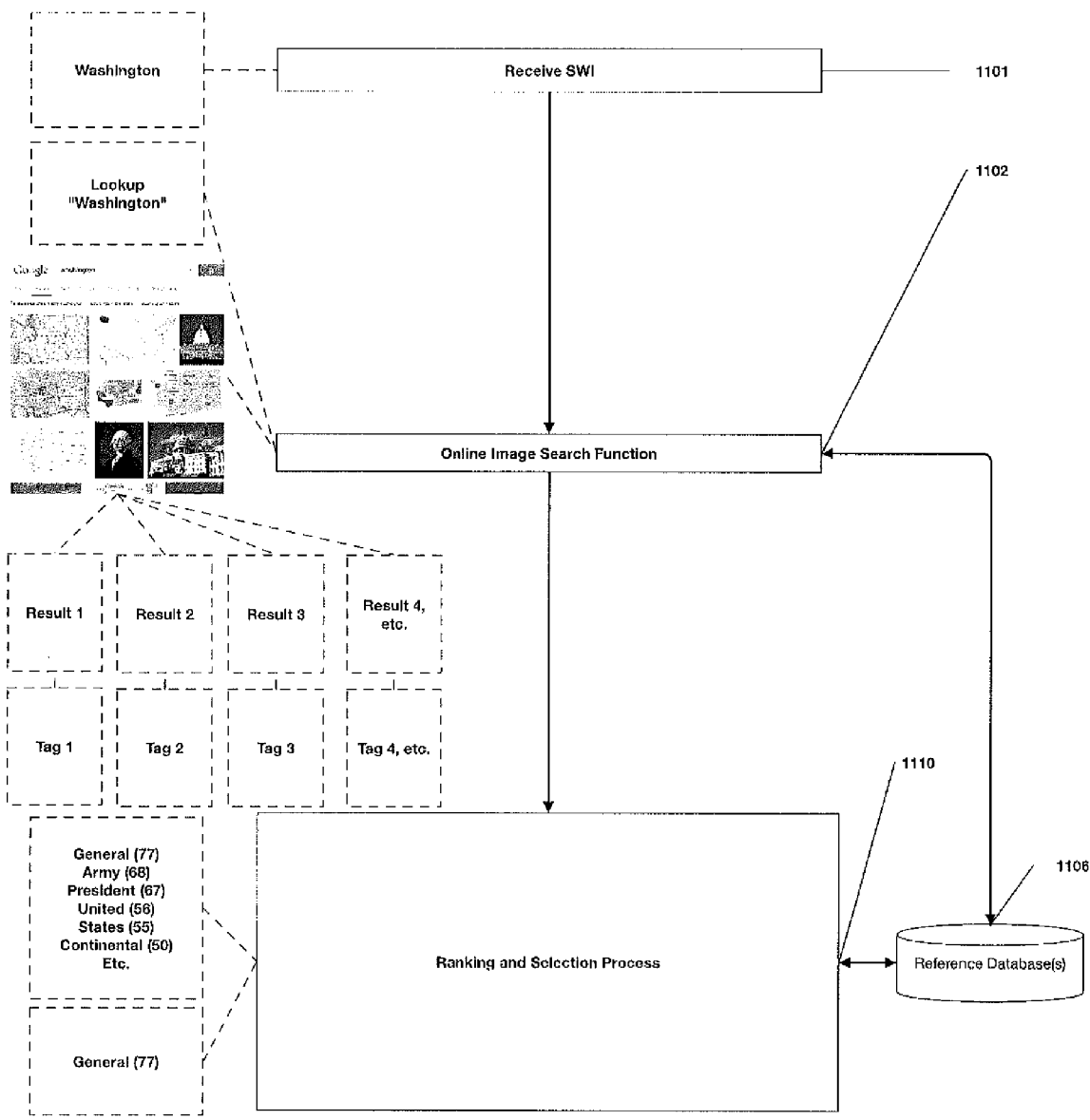
FIG. 11 shows a flowchart exemplary embodiment of a component suggesting process in accordance with the principles of the present disclosure.

As shown in FIG. 11, the module 6 process 1100 may include the following steps: Receive the SWI (step 1101) whereby the module 6 process 1100 may receive the SWI from step 504 above. The module 6 process 1100 may then perform an online image search function 1102 whereby the SWI is input into one or more reference database(s) (e.g. Google Images, Bing Images, or any other internet image search etc.) which may return a set of all components located in the tags (for example, the html file image descriptions) of the "top results" images (a pre-defined number of "top results", for instance, the tags of the first 10 images thus obtained) in the form (X,Y,Z) where X, Y, and Z are individual words contained in the image tag. Such reference database(s) 1106 may be located in the processing electronics 111, 141, 154 or the database 142 of FIG. 1. Further, the module 6 process 1100 may then send the resulting sets as new inputs to all other modules, recursively for a given depth, creating a number of new sets. The resulting sets may also be ranked and selected by a ranking and selection process (step 1110). The ranking and selection process (step 1110) may be the same or similar to the ranking and selection process (step 610) detailed in FIG. 6, above.

Module 7.

Figure 12:
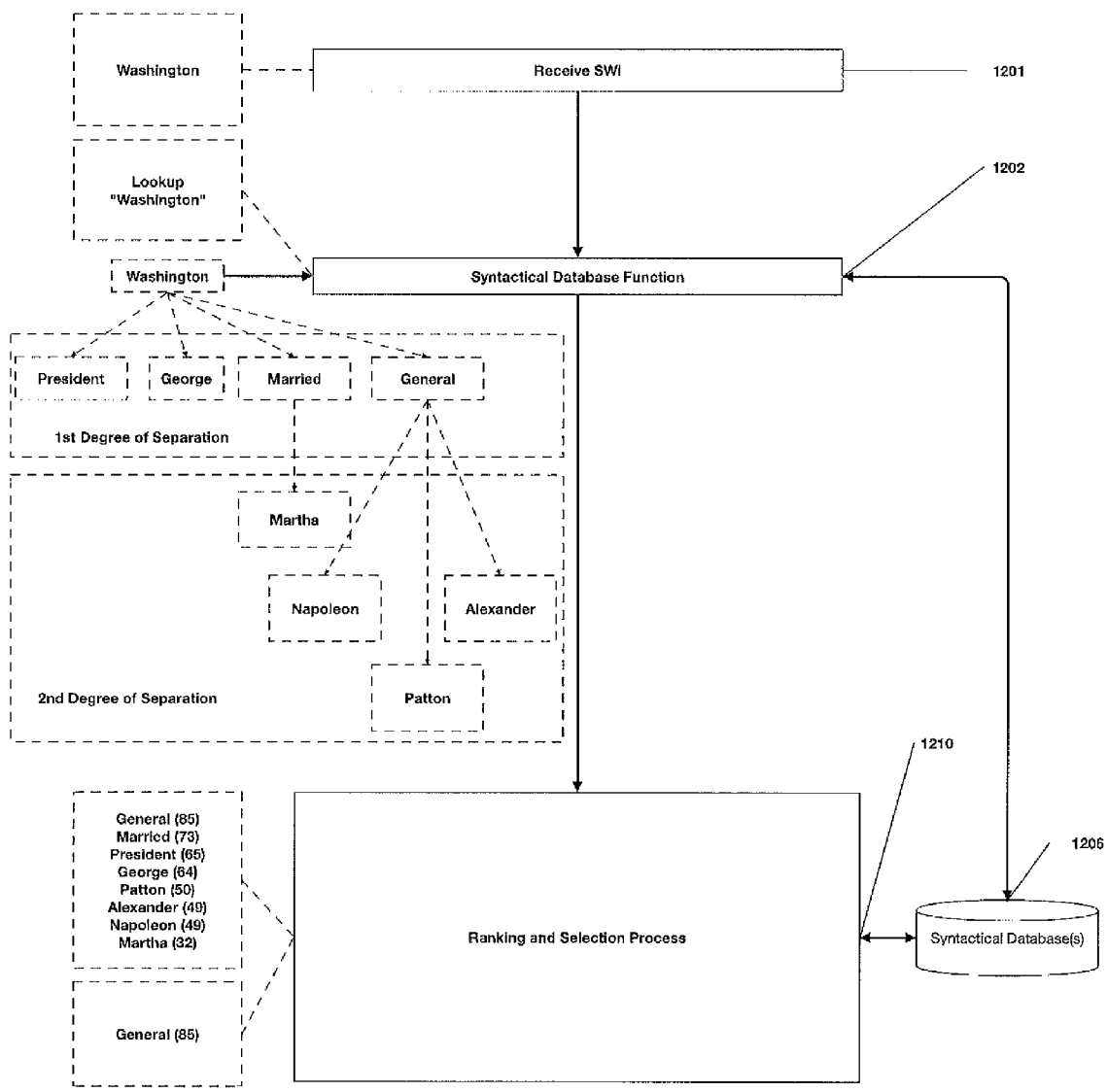
FIG. 12 shows a flowchart exemplary embodiment of a component suggesting process in accordance with the principles of the present disclosure.

As shown in FIG. 12, the module 7 process 1200 may include the following steps: Receive the SWI (step 1201) whereby the module 7 process 1200 may receive the SWI from step 504 above. The module 7 process 1200 may then perform a syntactical database function 1202 whereby the SWI is input into one or more syntactical database(s) 1206 (e.g. Word-Net, etc.) which may organize and relate words in syntactical sets ("synsets") according to pre-defined parameters. For example, as shown in FIG. 12, the SWI "washington" might return a synset including the words "president", "general", "George", "married", "Martha", etc., connected by different degrees. Such syntactical database(s) 806 may be located in the processing electronics 111, 141, 154 or the database 142 of FIG. 1. Further, the module 7 process 1200 may then send the resulting sets as new inputs to all other modules, recursively for a given depth, creating a number of new sets. The resulting sets may also be ranked and selected by a ranking and selection process (step 1210). The ranking and selection process (step 1210) may be the same or similar to the ranking and selection process (step 610) detailed in FIG. 6, above. Further, in addition to the ranking and selection process (step 610) of FIG. 6, above, components may be ranked according to how many relations they have. For example, as shown in FIG. 12, the component "General" may rank higher than the components "Married" or "George" because it has more total relations to other components (in this case 3 relations, versus "Married" (1 relation), "President" (0 relations) and "George" (0 relations)). Further, components may be ranked according to degrees of separation to other components. For example, as shown in FIG. 12, given the SWI "Washington", the component "George" may rank higher than the component "Martha" if it has less degrees of separation (for example, if the synset for "Washington" connected "Washington" directly with "George" and connected "Martha" through the word "Married").

Module 8.

Figure 13:
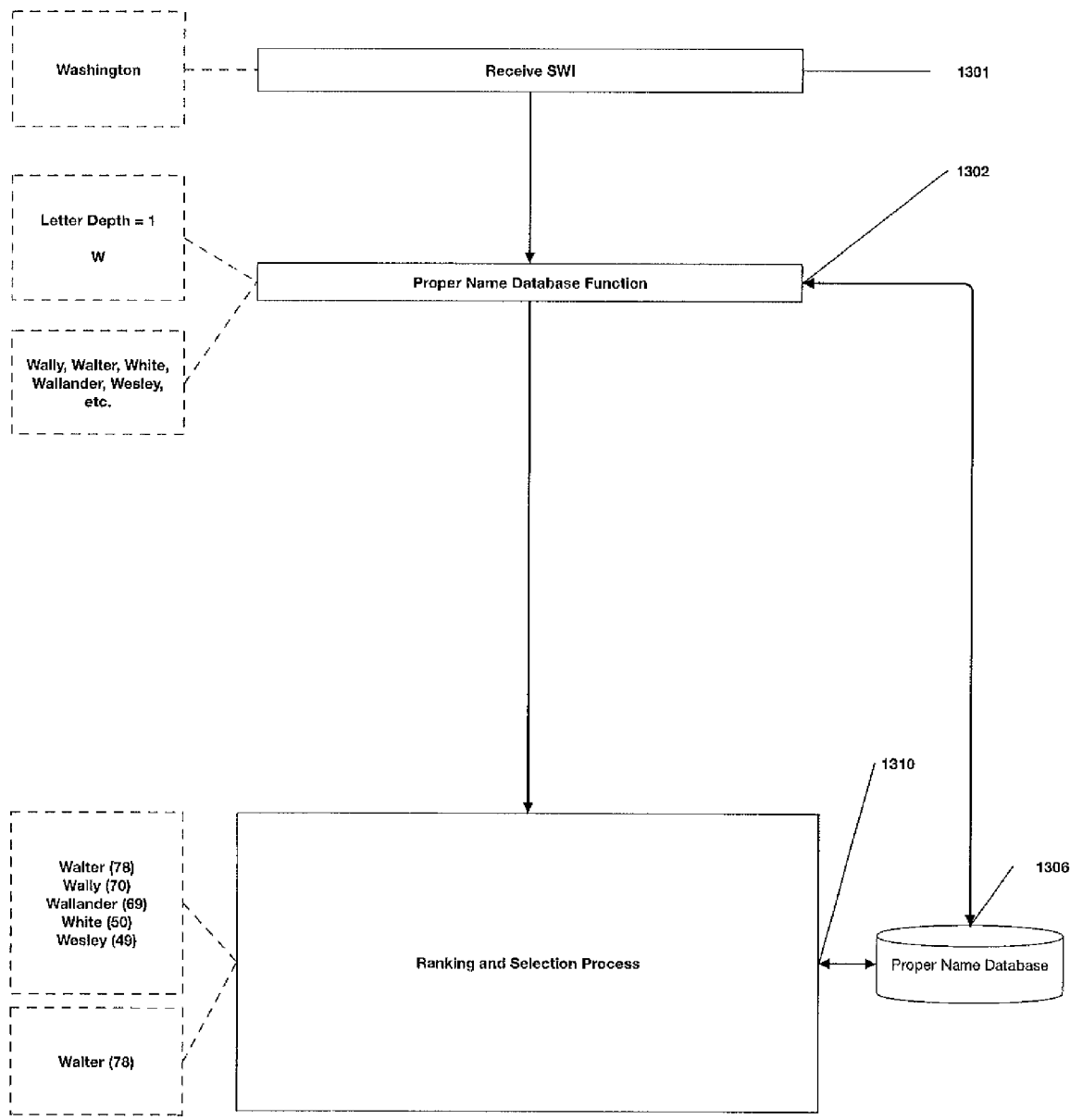
FIG. 13 shows a flowchart exemplary embodiment of a component suggesting process in accordance with the principles of the present disclosure.

As shown in FIG. 13, the module 8 process 1300 may include the following steps: Receive the SWI (step 1301) whereby the module 8 process 1300 may receive the SWI from step 504 above. The module 8 process 1300 may then perform a proper name database function 1302, cross-referencing with a proper name database 1306 (e.g. List of Historical names, friends names, family names, Contemporary celebrity names) in which proper names (components) may be organized alphabetically. Such syntactical database(s) 1306 may be located in the processing electronics 111, 141, 154 or the database 142 of FIG. 1. The module 8 process 1300 may then generate a set of all proper names matching the letter depth selected by the user or AIA. For example, as shown in FIG. 13, given the SWI "Washington" and the letter depth selection of the first letter "W", the module 5 process may generate a set including the components "Wally", "Walter", "White", "Wallander", "Wesley", etc. The resulting sets may also be ranked and selected by a ranking and selection process (step 1310). The ranking and selection process (step 1310) may be the same or similar to the ranking and selection process (step 610) detailed in FIG. 6, above. Further, the process may assign a higher rank to components that contain more matching letters after the letter input identified. For instance, as shown in FIG. 13, the SWI "Washington" may return both "Wesley" and "Walter" but "Walter" may be ranked higher because of more matching letters ("Walter" (two letters, WA) versus "Wesley" (one letter, W)).

6. As shown in FIG. 5, the memory enhancing method that suggests components 500 may also rank suggested components 506 among all of the suggested components generated in step 505 by the component generation modules selected in step 504. The ranking and selection process (step 506) may be the same or similar to the ranking and selection processes (steps 610, 710, 810, 910, 1010, 1110, 1210, 1310) detailed in FIGS. 6-13 above. Further, generally, the process may assign a higher rank to components that are most similar to the items selected in step 503, for example, given a word as an input, those components contain more matching letters. Further, the ranking and selection process 506 may compare all of components in all of the sets generated by the component generation modules 1-8 in step 505 and output a ranked sub-set identifying the highest ranking components. For example, the ranking and selection process 506 may increase the rank of a component that appears in more sets and decrease the rank of a component that appears in comparatively less sets. Further, as explained above by reference to step 610 detailed in FIG. 6, the ranking and selection process 506 may allow a user or AIA to select one or more of the generated and ranked components to be stored in the memory enhancing file 302 possibly through the memory enhancing interface 510, 304. If no component is selected by the user or AIA, and if the user so desires, the ranking and selection process 506 may allow the user to enter arbitrary components to be stored in the memory enhancing file 302. Such arbitrary components may then be added by the memory enhancing process to the processing electronics 111, 141, 154 or any of the databases 142, 606, 706, 806, 906, 1006, 1106, 1206, 1306 identified in FIG. 1 or FIGS. 6-13.

7. The memory enhancing method that suggests components 500 may then allow the user or AIA to enter a component modification process 507 in order to modify the selected components to increase their memorability. The component modification process may include the following steps: Receive a selection whereby the component modification process may receive a selection from the ranking and selection process 506 above. The user or AIA may then select component modification module(s). For example a user or AIA may select among the following modules:

i. SIZE: e.g. gigantic, enormous, big, small, microscopic, etc.
ii. COLOR: e.g. sky blue, red, green, etc.
iii. NUMBER or QUANTITY: e.g. one, two, three, a dozen, a million, a ton, etc.
iv. CONTEXT: e.g. in a can, on a fence, with shoes, to a dog, to a cat, etc.
v. ACTIONS: e.g. dancing, jumping, singing, etc.
vi. THEMES: e.g. SYNSETS related to: military, children, pets, medical, anatomical, legal, etc.

In accordance with the principles of the present invention, once the user selects a component modification module, the component modification process may then generate component modifiers, cross-referencing with a component modifier database. Such component modifier database may be located in the processing electronics 111, 141, 154 or the database 142 of FIG. 1. Further, the generated modifiers may also be ranked and selected by a ranking and selection process. The ranking and selection process may be the same or similar to the ranking and selection process (step 610) detailed in FIG. 6, above. The user or AIA may then make a selection for the component modification process to apply the selected modifier. The resulting modified component can be saved in the memory enhancing file 302, possibly through the memory enhancing interface 304 of FIG. 3.

Figure 14:
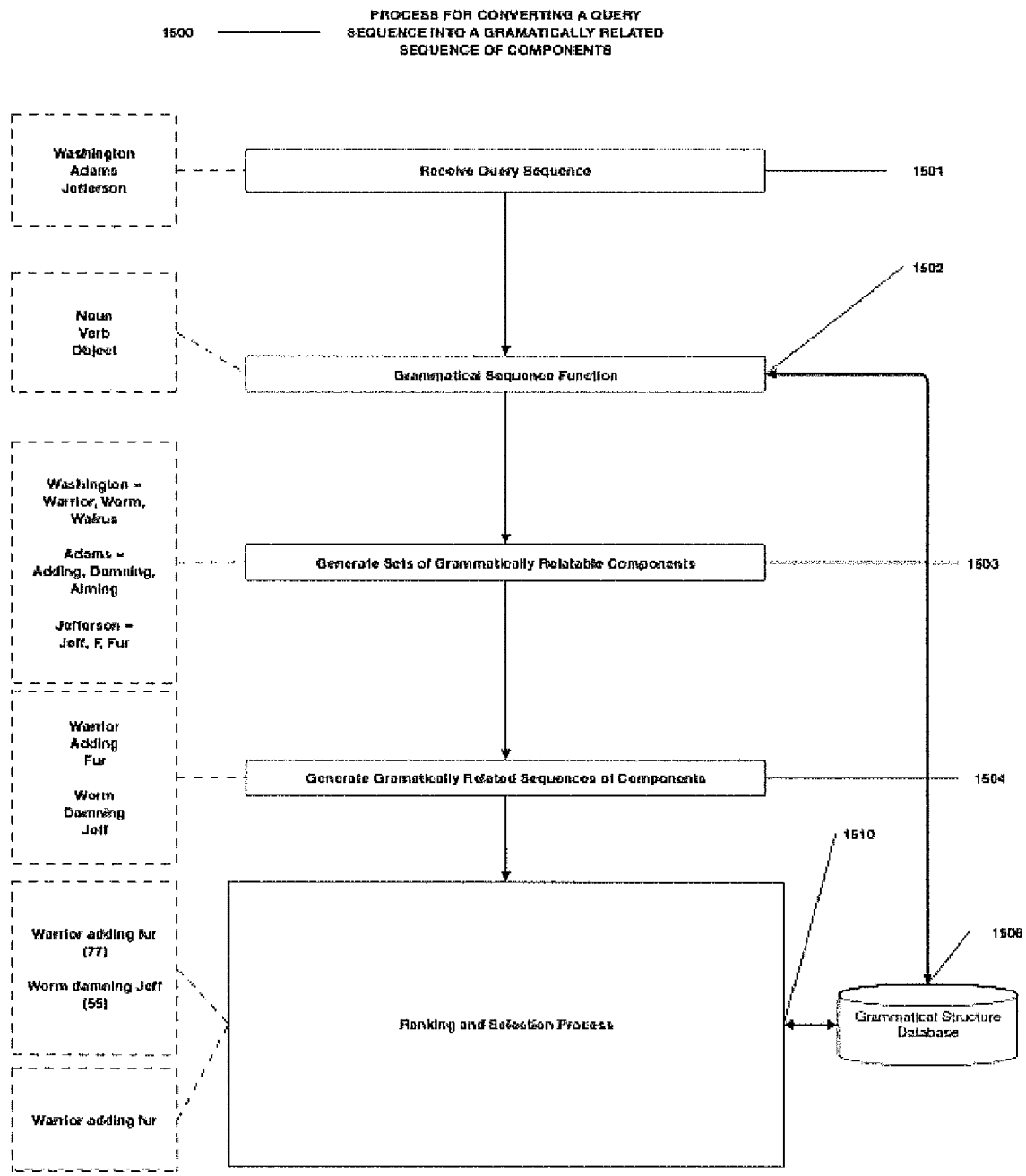
FIG. 14 shows a flowchart exemplary embodiment of a process for converting a query sequence into a grammatically related sequence of components in accordance with the principles of the present disclosure.
Figure 15:
FIG. 15 shows a more detailed process of the memory enhancing method that suggests component structures in accordance with the principles of the present disclosure.

8. As shown in FIG. 14, the memory enhancing method that suggests components 500 may also include a process for converting a query sequence into a grammatically related sequence of components 1500. As shown in FIG. 14, the process 1500 may include the following steps: Receive query sequence (step 1501) whereby the process 1500 may receive a sequence of one or more queries. The process 1500 may then perform a grammatical sequence function 1502 whereby based on the given number of queries in the sequence, a grammatical structure may be identified to match the number of queries. For example, given a sequence of queries that is a list of the first three presidents (e.g. Washington, Adams, Jefferson), the process 1500 may, cross-referencing with a grammatical structure database 1506, identify a grammatical structure consisting of NOUN, VERB, OBJECT. Such grammatical structure database 1506 may be located in the processing electronics 111, 141, 154 or the database 142 of FIG. 1. Further, the process 1500 may generate sets of grammatically relatable components 1503 for each query (e.g Washington=warrior, worm, walrus; Adams=adding, damning, aiming; Jefferson=Jeff, F, fur) to fit the identified grammatical structure. Such sets of components may be generated by the component generation and modification modules and processes explained above in FIGS. 6-13. Further, the process 1500 may generate grammatically related sequences of components 1504. may select at least one of the components for each query (Washington=warrior; Adam=adding; Jefferson=fur) to fit the grammatical structure identified. For example, as shown in FIG. 15, the process 1500 may generate the grammatically related sequences "Warrior adding fur" and "Worm damning Jeff". The process 1500 verifies if the replacement of selected components of each query is grammatically correct. If the components do not fit the grammatical structure recommended, the process 1500 may substitute different components. The process 1500 may perform the replacement until all the components match the recommended grammatical structure. The resulting sequences may also be ranked and selected by a ranking and selection process (step 1510). The ranking and selection process (step 1510) may be the same or similar to the ranking and selection process (step 610) detailed in FIG. 6, above. Selections may then be added by the process 1500 to the processing electronics 111, 141, 154 or any of the databases 142, 606, 706, 806, 906, 1006, 1106, 1206, 1306, 1406 identified in FIG. 1 or FIGS. 6-13. Memory Enhancing Method that Suggests Component Structures.

As shown in FIG. 15, with regards to the problem of transforming a structured query (for example, a query consisting of a nested outline structure of text arranged into headings and one or more levels of nested subheadings) into an original memory enhancing file that includes a component structure for arranging components, a memory enhancing method that suggests component structures 1600, solving the problem as detailed below. Such memory enhancing method 1600 may be the memory enhancing method 303 of FIG. 3.

Figure 16:
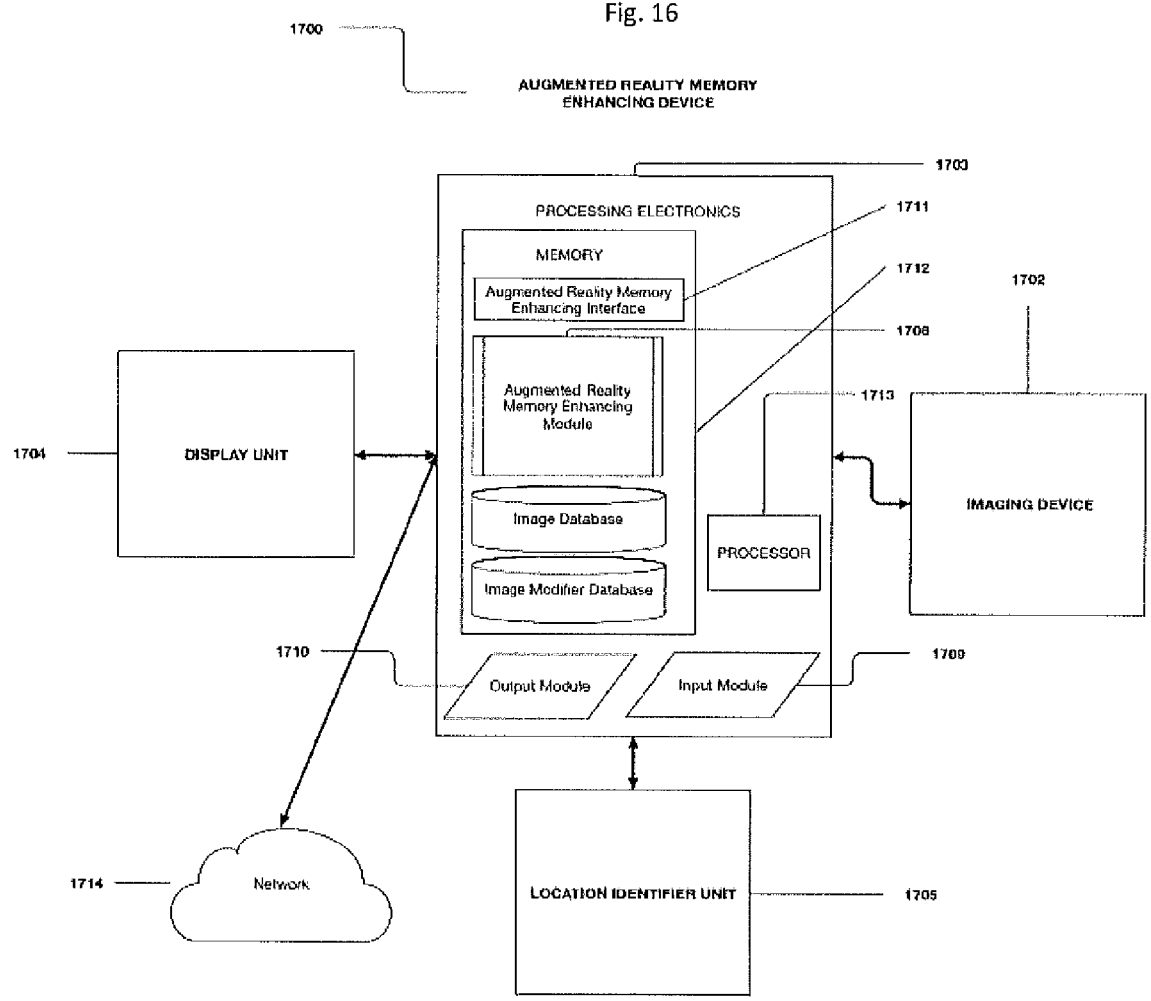
FIG. 16 shows a general structure of an augmented reality memory enhancing device that superposes components in real-world locations in accordance with the principles of the present disclosure.

As shown in FIG. 15, the memory enhancing method 1600 may include the following steps:
1. Receive the structured query (step 1601) whereby the memory enhancing method 1600 may receive a structured query, possibly from step 301 of FIG. 3, above. For example, the memory enhancing method 1600 may receive a query structured as an outline with headings ("H") and nested levels of sub-headings ("SH") in the form (H1 (SH1 (SSH1 (SSSH1 . . . )))). Further, the headings and/or subheadings may correspond to individual words and/or other components indexed by words in the form "X, Y, Z" composed of one or more letters in the form ("xyz . . . ", so that X=xabc . . . , Y=yabc . . . , and Z=zabc . . . ). For example, as shown in FIG. 16, the following structured query may be received:

"LAW
I. Contracts
II. Torts
  A. Intentional Torts
  B. Negligence"

Given such a structured query, the memory enhancing method 1600 may continue with the steps detailed below.
2. Perform a structure extracting function (step 1602) whereby the number of nested headings and/or sub-headings and their relation is determined. For example, as shown in FIG. 15, there is one heading ("LAW"), two sub-headings ("1. Contracts" and "2. Torts"), and two sub-sub-headings ("A. Intentional Torts" and "B. Negligence") relating to the second sub-heading. The structure extracting function (step 1602) may be performed by cross-referencing with a component structure database 1606. Such component structure database 1606 may be located in the processing electronics 111, 141, 154 or the database 142 of FIG. 1.
3. Next, the memory enhancing method 1600 may generate matching structures (step 1603) possibly by cross-referencing with a component structure database 1606. Such component structure database 1606 may be located in the processing electronics 111, 141, 154 or the database 142 of FIG. 1. Further, matching structures may be generated by one or more methods: for example, a modular space method (step 1604) or a suggested component method (step 1605). For example, as shown in FIG. 15, the modular space method (step 1604) may locate matching structures in the component structure database or build a matching structure using modular components that may be combined in a nested manner such as, for example, galaxies, star systems, planets, continents, countries, cities, neighborhoods, blocks, buildings, floors, rooms, etc. As shown in FIG. 15, the matching structure generated consists of a building with two floors and two rooms on the second floor. In another example, a component structure of an encyclopedia may be used, with volumes, chapters, pages, paragraphs, sentences, lines, words, letters, etc. As shown in FIG. 15, the suggested component method (step 1605) may locate matching components for the headings, sub-headings, and sub-sub-headings in the component structure database 1603 using a process that may be the same or similar to the memory enhancing method that suggests components 500 from FIG. 5 or such matching components may be located by with a component structure database 1606. Such component structure database 1606 may be located in the processing electronics 111, 141, 154 or the database 142 of FIG. 1. For example, as shown in FIG. 15, given the extracted structure "H(SH(SSH1,SSH2))", and given the heading "LAW" containing the sub-heading "CONTRACTS" and "TORTS"

with sub-sub-headings for "TORTS" of "INTENTIONAL TORTS" and "NEGLIGENCE", the suggested component method could suggest the following arrangement of components "LIBRARY(CAROUSEL,TENT(INFIRMARY, NEST))". may build a matching structure heading "LAW" might recommend the components "library", "laboratory", "love-nest", "lawyer", etc.

4. The resulting component structures may also be ranked and selected by a ranking and selection process (step 1610). The ranking and selection process (step 1610) may be the same or similar to the ranking and selection process (step 610) detailed in FIG. 6, above.

4. The memory enhancing method that suggests component structures 1600 can also, given 2D or 3D geometries, automatically recommend locations for components in said geometries for a user or AIA to select. For example, the method 1600 could recommend vertices of geometric figures or sub-divisions of lines as suitable locations for components. The user or ATA could also select arbitrary locations for components. Such selection could be made through a memory enhancing interface 1611 that may be the same memory enhancing interface 304, 510 from FIGS. 3 and 5. If no component structure is selected by the user or AIA, and if the user so desires, the ranking and selection process (step 1610) may allow the user to build an arbitrary structure to be stored in the memory enhancing file 302. Such arbitrary structure may then be added by the memory enhancing process to the processing electronics 111, 141, 154 or any of the databases 142, 1610 identified in FIG. 1 or FIG. 15.

Memory Enhancing Method that Superposes Components in Real-World Locations ("Augmented Reality Memory Enhancing Method")

FIG. 16 shows a general structure for an augmented reality memory enhancing device 1700, for example, a wearable device that can superpose components on a display so that to the user they appear in a real-world location. The augmented reality memory enhancing device 1700 may include an imaging device 1702 (for example, a digital camera, scanner, 3D scanner), processing electronics 1703, at least one display unit 1704 positioned in front of the eyes of the user, a location identifier unit 1705 (for example, a Global Positioning System (GPS), RFID reader, WIFI antenna, accelerometer, or any other system which may be used to determine the location and/or orientation of the augmented reality device 1701). According to various exemplary embodiments, such augmented reality device 1701 may also include any number of computing platforms 110, servers 140, display units 130, 151 and clients 150, detailed in FIG. 1. Further, the augmented reality memory enhancing device 1700 may be connected or coupled to a network 1714, as that term is defined above. Further, the augmented reality device 1700 may be the same device as the computing platform 110, or the display unit 1704 may be the same display unit 120 of the computing platform 110. It should be appreciated that any combination of computing platforms, servers, clients, networks, and display units may be implemented in the augmented reality memory enhancing device 1700 without departing from the scope of the present disclosure. Further the processing electronics 1703 may contain a processor 1713, memory 1712, and an augmented reality memory enhancing module 1706.

The augmented reality memory enhancing module 1706 which may be located in memory 1712 may comprise a collection of instructions to process any inputs received by the imaging device 1702, display unit 1704, or location identifier unit 1705 and further may provide components to the display unit which may appear superposed in the real-world location, perceived by the user using the augmented reality memory enhancing device 1700.

Further, the augmented reality memory enhancing device 1700 may combine features previously presented for the memory enhancing methods 303, 500, 1600 detailed respectively in FIGS. 3, 5, and 15. Further, the augmented reality memory enhancing device 1700 may include an image database 1707 comprised of static or animated 2-D or 3-D images and an image modifier database 1708. Said databases 1707, 1708 may contain components (e.g. 2D or 3D images) indexed with one or more tags. Further the augmented reality memory enhancing device 1700 may contain an input module 1709 and an output module 1710 for a user to interact with the device, possibly through an augmented reality memory enhancing interface 1711. This augmented reality memory enhancing interface 1711 may be the same or similar to the memory enhancing interface 304 from FIG. 3.

Figure 17:
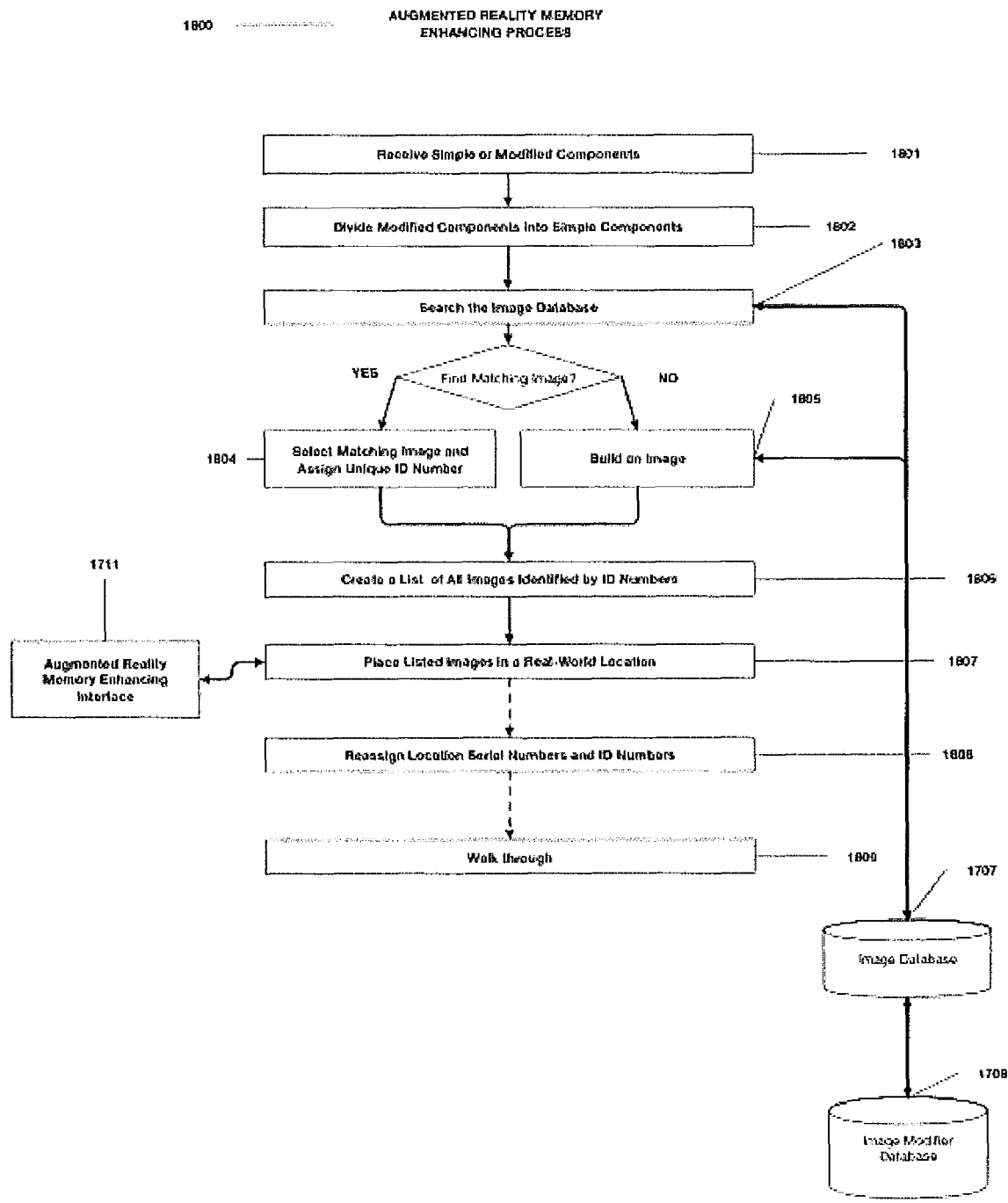
FIG. 17 shows a flowchart exemplary embodiment of an augmented reality memory enhancing process in accordance with the principles of the present disclosure.

FIG. 17 shows how the memory enhancing device 1700 may be used for an augmented reality memory enhancing process 1800 as further explained below.

1. Receives simple or modified components (step 1801), possibly selections of the memorable enhancing methods 303, 500, 1600 (e.g. simple="tree", modified="big tree", "blue tree", "burning tree", "tree hitting dog", etc.).
2. Divides modified components into simple components (step 1802) (e.g. "big tree"="big"+"tree"; "blue tree"="blue"+"tree"; "burning tree"="burning"+"tree"; "tree hitting dog"="tree" "hitting" "dog", etc.).
3. Searches the image database 1707 (step 1803) (for example, the indexes and/or tags) for matches to each simple or modified component.
4. If the search returns a matching result, the augmented reality memory enhancing process 1800 may select the matching image and assign it a unique ID NUMBER (e.g. 001) (step 1804) (e.g. a search for "tree" or "big tree" might return hits for images for both "tree" and "big tree"). The unique ID NUMBER may be stored in memory.
5. If the augmented reality memory enhancing process 1800 only returns partially matching index entries in the image database 1707 and image modifier database 1708, it may build an image (step 1805) (composed of one or more images and one or more image modifiers) in the following manner:
   a. If search finds a partially matching tag in the image database 1707, the augmented reality memory enhancing process 1800 may select the matching image and places it in memory (e.g. a search for "big tree", "blue tree", or "burning tree" might only return "tree"; while "tree hitting dog" might return only "tree" and "dog");
   b. Then the augmented reality memory enhancing process 1800 may search the image modifier database 1708 for the remaining unfound image modifiers separately (e.g. "big", "blue", "burning", "hitting");
   c. If the augmented reality memory enhancing process 1800 finds a matching tag for the missing image modifier (e.g. "big", "blue", or "burning"), then it may apply that modifier to the image or images stored into memory, resulting in a new compound image (e.g. "big tree", or "blue tree" or "burning tree" or "tree hitting dog)";
   d. Once the compound image is built, the augmented reality memory enhancing process 1800 assigns it a unique ID NUMBER (e.g. 002) and stores it in memory;

6. The augmented reality memory enhancing process 1800 may create a LIST of all images uniquely identified by ID NUMBERS (step 1806).
7. The augmented reality memory enhancing process 1800 may allow a user or AIA to "place" LISTED images in an existing real-world location (step 1807) using "augmented reality" through one or more of the following methods:
   a. The user may place a uniquely identifiable location serial number or particular indicia ("the location serial number") in a given real-world location (for example, by adhering or placing a printed bar code or QR code that recalls the location serial number, or by adhering or placing an electronically enabled chip or device that could transmit the "location serial number" through a blue-tooth signal, or RFID signal, etc.) and then assign that serial number to an image the user wishes to place at that location. The augmented reality memory enhancing process 1800 may then output or render the image stored in memory onto the display unit(s), resulting in the user seeing the image in the real-world location. Furthermore, these methods could transmit additional information (for example information about the user's perspective/point-of-view for the processing electronics 1703 to render the 2-D or 3-D image).
   b. The user or AIA may also assign a "location serial number" to a uniquely identified GPS or other geographically identified location. Then, the processing electronics 1703 may render the linked memorable image at that location.
8. Finally, the user or AIA may reassign "location serial numbers" and ID NUMBERS (step 1808) so as to change the location of superposed images or eliminate them entirely.
9. Finally, the augmented reality memory enhancing process 1800 may allow a user to walk through (step 1809) a real-world physical space while seeing superposed images and/or image modifiers, in this way learning their sequence and memorizing or enhancing the memorization of the data they represent.

The disclosure is not limited to the precise configuration described above. While the disclosure has been described as having a preferred design, it is understood that many changes, modifications, variations and other uses and applications of the subject disclosure will, however, become apparent to those skilled in the art without materially departing from the novel teachings and advantages of this disclosure after considering this specification together with the accompanying drawings. Accordingly, all such changes, modifications, variations and other uses and applications which do not depart from the spirit and scope of the disclosure are deemed to be covered by this disclosure as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present disclosure, as well as equivalents thereof. The details in the patents, patent applications, and publications incorporated by reference herein may be considered to be incorporable at applicant's option, into the claims during prosecution as further limitations in the claims to patently distinguish any amended claims from any applied prior art.

The invention claimed is:

1. A computer-based system for generation of a memory palace comprising: a processor;
   a network interface;
   an output device;
   an input device, for receiving a linguistic input as a query;
   a memory comprising:
      one or more memory palace representations comprising a plurality of spatial component placeholders;
      a component database;
      a significant word input storage; and
         a memory enhancing interface comprising computer-readable code for:
   receiving the query by the memory enhancing interface;
      parsing the query into one or more significant word inputs:
      storing on the significant word input storage the one or more significant word inputs;
      generating a plurality of memory enhancing components suggestions according to one or more component suggestion modules using the selected significant word inputs, wherein the memory enhancing suggested components are cross-referenced with a component modifier database to generate a memorable component;
      ranking and selecting a plurality of selected memory enhancing components from the plurality of memory enhancing component suggestions; and
      associating the plurality of selected memory enhancing components to the plurality of spatial component placeholders; wherein the output device displays said one or more palace representations.

2. The computer-based system for generation of a memory palace according to claim 1, wherein the memory enhancing components and the one or more memory palace representations are stored as downloadable files in the component database.

3. The computer-based system of claim 1, wherein the memory enhancing interface identifies a grammatical structure by accessing a grammatical structure database and generates one or more sets of grammatically relatable components for the query based on the grammatical structure.

4. The computer-based system for generation of a memory palace according to claim 1, wherein the linguistic input is a text having an outline structure wherein the means for parsing the linguistic input and storing on the significant word input storage the parsed linguistic input as one or more significant word inputs further comprises identifying and extracting the outline structure of the text and generating a memory palace representation according to the extracted outline structure, wherein the means for generating a plurality of memory enhancing components suggestions further comprises suggesting a component structure based on the spatial structure.

5. The computer-based system for generation of a memory palace according to claim 1, further comprising a location identifier device, wherein the plurality of spatial component placeholders are associated to one or more real-world locations, wherein the memory enhancing components are displayed in the output device when the one or more real-world locations associated to the plurality of spatial component placeholders are detected by the location identifier device.

6. The computer-based system for generation of a memory palace according to claim 5, wherein the output device is a wearable computing device.

7. The computer-based system for generation of a memory palace according to claim 5, wherein the output device is a mobile computing device.

8. The computer-based system for generation of a memory palace according to claim 5, wherein the location identifier device is a Global Positioning System.

9. The computer-based system for generation of a memory palace according to claim 5, wherein the location identifier device is a WiFi antenna.

10. The computer-based system for generation of a memory palace according to claim 5, wherein the location identifier device is an accelerometer.

11. The computer-based system for generation of a memory palace according to claim 5, wherein the location identifier is an imaging device configured to recognize adjustable indicia.

12. The computer-based system for generation of a memory palace according to claim 5, wherein the location identifier is an RFID reader or a Bluetooth receiver and scanner.

13. The computer-based system for generation of a memory palace according to claim 5, wherein the location identifier is a Bluetooth receiver and scanner.

14. A computer-implemented method for generation of a memory palace, comprising executing on a processor the steps of:
   receiving a linguistic input as a query;
   parsing the query, by a memory enhancing interface, into one or more significant word inputs;
   storing on the significant word input storage the one or more significant word inputs;
   receiving one or more items for components suggestion;
   receiving a selection for one or more component generation modules;
   generating suggested components from a component database according to the one or more component generation modules, wherein the suggested components are cross-referenced with a component modifier database to generate a memorable component;
   ranking and selecting components according to the one or more component generation modules;
   receiving further component modifications; and
   displaying said suggested components in an output device.

15. The computer-implemented method of claim 14, wherein the memory enhancing interface identifies a grammatical structure by accessing a grammatical structure database and generates one or more sets of grammatically relatable components for the query based on the grammatical structure.

16. The computer-implemented method of claim 14, wherein the query is a text having an outline structure wherein the memory enhancing interface parses the query by identifying and extracting the outline structure of the text and generates a spatial structure according to the extracted outline structure, wherein the generating suggested components according to the one or more component generation modules step further comprises suggesting a component structure based on the spatial structure.

17. The computer-implemented method of claim 14, wherein the memory enhancing interface performs a cut-up function on the query by segmenting it into one or more words according to punctuation characters or whitespace characters.

18. The computer-implemented method of claim 17, wherein the generating suggested components according to the one or more component generation modules step further comprises generating a collection of tokens for each input in the one or more significant word inputs, each token in the collection of tokens consisting of a sequential set of characters of the input, and searching the component database for each token.

19. The computer-implemented method of claim 18, wherein the first character of each token is the first character of the input.

20. The computer-implemented method of claim 19, wherein each token in the collection of tokens consists of a sequential set of characters of the input.

21. The computer-implemented method of claim 20, wherein each token in the collection of tokens consists of a sequential set of characters of the input corresponding to a phoneme.

* * * * *